United States Patent
Ma et al.

[11] Patent Number: 6,078,741
[45] Date of Patent: Jun. 20, 2000

[54] AUTOMATIC GENERATION OF RECONFIGURATION SCRIPTS FOR TELECOMMUNICATION DEVICES

[75] Inventors: Xiwen Ma, Berkeley; XiaoLin Tian, Cupertino; Steve Berriatua, San Bruno; Simon Moloney, Redwood City; Mark Russell, San Francisco, all of Calif.

[73] Assignee: Firsttel Systems Corporation, Redwood Shores, Calif.

[21] Appl. No.: 08/795,917

[22] Filed: Feb. 5, 1997

[51] Int. Cl.[7] .................................................. G06F 9/455
[52] U.S. Cl. ............................................... 395/500.45
[58] Field of Search ................................ 395/500, 309, 395/500.45, 500.44; 364/578

[56] References Cited

U.S. PATENT DOCUMENTS

| | | | |
|---|---|---|---|
| 5,265,252 | 11/1993 | Rawson et al. | 395/681 |
| 5,414,812 | 5/1995 | Filip et al. | 395/200.53 |
| 5,450,486 | 9/1995 | Maas et al. . | |
| 5,546,595 | 8/1996 | Norman | 395/830 |
| 5,613,123 | 3/1997 | Tsang et al. | 395/651 |
| 5,630,076 | 5/1997 | Saulpaugh et al. | 395/681 |
| 5,653,559 | 8/1997 | Stieb et al. . | |
| 5,664,008 | 9/1997 | Bossi et al. . | |
| 5,671,355 | 9/1997 | Collins | 395/500 |
| 5,754,628 | 5/1998 | Bossi et al. . | |
| 5,771,386 | 6/1998 | Baumbauer . | |

OTHER PUBLICATIONS

PCT International Search Report, Oct. 1998, 4 pgs.

*Primary Examiner*—Kevin J. Teska
*Assistant Examiner*—Kyle J. Choi
*Attorney, Agent, or Firm*—Blakeley Sokoloff Taylor & Zafman, LLP

[57] ABSTRACT

An apparatus is programmed with a plurality of programming instructions for automatically generating a reconfiguration script comprising a plurality of configuration commands for reconfiguring a plurality of telecommunication devices of a telecommunication system, based on a current and a target descriptive image of the telecommunication system. The current descriptive image specifies the devices and their features included in the current configuration of the telecommunication system, whereas the target image specifies the devices and their features to be included in the target configuration of the telecommunication system. The plurality of programming instructions generate the reconfiguration script employing feature dependency graph (FDG) data structures, a device model modeling the rules and behaviors of the telecommunication devices, and feature deletion/addition linklists.

22 Claims, 25 Drawing Sheets

```
Current Imate {                          Target Imate {
    . . .                                    . . .
Station 4 {                              Station 4 {
    Len: "Host 0 2 1 11 4",                  Len: "Host 0 2 1 11 4",
    SetType: M5312                           SetType: M5312
        Button: 1 {                              Button: 1 {
            Feature: DCPU                            Feature: DCPU
            Feature: CWI                             Feature: CWI
            Feature: MDN {                           Feature: MDN {
                MDNDN: 206-5101                          MDNDN: 206-5101
                . . . }}}                                . . . }}}
        Button: 2 {                              Button: 2 {
            Feature: DNH {                           Feature: DNH {
                DNHGRID: 206-5118                        DNHGRID: 206-5118
                DNHMEMNO: 0                              DNHMEMNO: 1
                . . . }}}                                . . }}}
Station: 5 {                             Station: 5 {
    Len: "Host 0 2 1 11 5",                  Len: "Host 0 2 1 11 5",
    SetType: M5312                           SetType: M5312
        Button: 1 {                              Button: 1 {
            Feature: DCPU                            Feature: DCPU
            Feature: CWI                             Feature: CWI
            Feature: DNH {                           Feature: DNH {
                DNHGRID: 260-5118                        DNHGRID: 260-5118
                DNHMEMNO: 1                              DNHMEMNO: 0
                . . . }                                  . . . }
        Button: 2 {                              Button: 2 {
            Feature: DCPU                            Feature: DCPU
            Feature: CWI                             Feature: CWI
            . . . }                                  . . . }
        Button: 3 {                              Button: 3 {
            Feature: CWT}}                           Feature: CWT}}
Station: 6 {                             Station: 6 {
    Len: "Host 0 2 1 11 6",                  Len: "Host 0 2 1 11 6",
    SetType: BTS                             SetType: BTS
        Button: 1 {                              Button: 1 {
            Feature: DCPU                            Feature: DCPU
            Feature: CWI                             Feature: CWI
            Feature: DNH {                           Feature: DNH {
                DNHGRID: 206-51118                       DNHGRID: 206-51118
                DNHMEMNO: 2                              DNHMEMNO: 2
                . . . }}}                                . . . }}}
Station: 7 {                             Station: 8 {
    Len: "Host 0 2 1 11 7",                  Len: "Host 0 2 1 11 8",
    SetType: BTS                             SetType: BTS
        Button: 1 {                              Button: 1 {
            Feature: MDN {                           Feature: MDN {
                MDNDN: 206-5101                          MDNDN: 206-5101
                . . . }}}}                               . . . }}}}
```

FIG. 12

- $ HOST 0 2 1 11 5 1 CWI $
- $ HOST 0 2 1 11 5 2 CWI $
- $ HOST 0 2 1 11 5 3 CWT $
//rmv scope node: 3/Club
//rmv scope node: Club
- $ HOST 0 2 1 11 5 1 DCPU $
//rmv scope node: 1 /Private
- $ HOST 0 2 1 11 5 2 DCPU $
//rmv scope node: 2/Private
//rmv scope node: Private
- $ HOST 0 2 1 11 5 2 MDN $
//rmv scope node: 3/Owner
//rmv scope node: Owner
- $ HOST 0 2 1 11 5 1 DNH $
- $ HOST 0 2 1 11 6 1 DCPU $
- $ HOST 0 2 1 11 6 1 CWI $
//rmv scope node: 1/Private
//rmv scope node: Private
- $ HOST 0 2 1 11 6 1 DNH $
- $ HOST 0 2 1 11 4 2 DNH $
- $ HOST 0 2 1 11 7 1 MDN $
+ $ HOST 0 2 1 11 5 1 DNH $
+ $ HOST 0 2 1 11 6 1 DNH $
//add scope node: Private
//add scope node: 1/Private
+ $ HOST 0 2 1 11 6 1 CWI $
+ $ HOST 0 2 1 11 6 1 DCPU $
+ $ HOST 0 2 1 11 4 2 DNH $
//addscope node: Owner
//add scope node: 3/Owner
+ $ HOST 0 2 1 11 5 2 MDN $
//add scope node: Private
//add scope node: 2/Private
+ $ HOST 0 2 1 11 5 2 DCPU $
//add scope node : 1/Private
+ $ HOST 0 2 1 11 5 1 DCPU $
//add scope node: Club
//add scope node: 3/Club
+ $ HOST 0 2 1 11 5 3 CWT $
+ $ HOST 0 2 1 11 5 2 CWI $
+ $ HOST 0 2 1 11 5 1 CWI $
+ $ HOST 0 2 1 11 8 1 MDN $

Figure 23

AUTOMATIC GENERATION OF RECONFIGURATION SCRIPTS FOR TELECOMMUNICATION DEVICES

BACKGROUND OF THE INVENTION

1. Field of the Invention

The present invention relates to the field of telecommunications. More specifically, the present invention relates to reconfiguration of a network of telecommunication devices.

2. Background Information

In the telecom industry, complex and specialized software and hardware systems are a given. Because each system is specialized, information used by one system is not easily manipulated for use in another. As a result, software designers are constantly asked to provide solutions, via software, that can integrate different systems in a consistent and easy-to-use manner.

Designing and building software that is consistently easy to use and can integrate and manipulate information from other systems is often extremely difficult. Device modeling gives to the software systems designer a method for representing behaviors of very complex devices in a model that is simple to use and understand. The model will remain the same even if the device changes; thus, the software designer is free to concentrate on the functional capability of a device.

Device emulation is used to mimic the behavior of a modeled device and its features. Where the device model is used in the context of device emulation, the device model is invoked as part of the application. Therefore, the capability of an application can be expanded by simply providing a new device model for any given device type. Of course, different applications are free to use the emulation of a device type for different purposes. Essentially, device emulation provides the "how" to device modeling's "what". Device emulation allows new features to be introduced in the system in a standard way, thus avoiding code changes, which in turn leads a more reliable product, and shorter development cycle.

Device emulation enables system developers to focus more on the system's functional objectives than on the peculiarities of the device or network elements being managed. All information exchanges between the network management software and the network elements take the form: 1) what needs to be done—the action, and, 2) what to do it with—the data. As an intermediary between components, the device emulation adds interpretation or knowledge (the how) to the action-plus-data (the what). When a user makes a change to a device, the network management software interprets what that change means using device emulation and then makes that change directly on the device. The device's response is in turn interpreted so the management software can understand it.

In copending U.S. patent application, Ser. No. 08/188,473, now U.S. Pat. No. 5,594,792 filed on Jan. 28, 1994, assigned to the assignee of the present invention, an improved method for efficiently modeling and emulating devices in a network of telecommunication systems was disclosed.

In addition to the complexity of these specialized software and hardware systems, constant changes, i.e. reconfiguration of devices in terms of their operating features and connectivity, is also a given. Thus, it is desirable to have an automated approach to reconfiguring telecommunication devices, in particular, an approach that can leverage on the modeling and emulation technique disclosed in the copending application.

SUMMARY OF THE INVENTION

An apparatus is programmed with a plurality of programming instructions for automatically generating a reconfiguration script comprising a plurality of configuration commands for configuring/reconfiguring a plurality of telecommunication devices of a telecommunication system, based on a current and a target descriptive image of the telecommunication system. The current descriptive image specifies the devices and their features included in the current configuration of the telecommunication system, whereas the target descriptive image specifies the devices and their features to be included in the target configuration of the telecommunication system. The plurality of programming instructions generate the reconfiguration script employing feature dependency graphs (FDG) data structures, a device model modeling the rules and behaviors of the telecommunication devices, and feature deletion/addition linklists.

In one embodiment, the plurality of programming instructions implement a number of functions, including in particular, a first and a second function for generating a current and a target FDG data structure for the current and target configurations, based on the current and target descriptive images and a device model modeling the rules and behaviors of the telecommunication devices. The functions further include a third function for building a reconfiguration FDG data structure based on the current and target FDG data structures, a fourth function for generating a feature deletion and a feature addition linklist based on the reconfiguration FDG data structure, and a fifth function for generating the reconfiguration script comprising the configuration/reconfiguration commands for effectuating the desired reconfiguration.

BRIEF DESCRIPTION OF DRAWINGS

The present invention will be described by way of exemplary embodiments, but not limitations, illustrated in the accompanying drawings in which like references denote similar elements, and in which:

FIG. 12 illustrates one example each of a current and a target image;

FIG. 23 illustrate the reconfiguration script generated per the deletion and addition linklists of FIGS. 21–22;

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details.

Parts of the description will be presented in terms of operations performed by a computer system, using terms such as data, flags, bits, values, characters, strings, and/or numbers, consistent with the manner commonly employed by those skilled in the art to convey the substance of their work to others skilled in the art. As well understood by those skilled in the art, these quantities take the form of electrical, magnetic, or optical signals capable of being stored, transferred, combined, and otherwise manipulated through mechanical and electrical components of the computer system; and the term computer system include general purpose as well as special purpose data processing machines, systems, and the like, that are standalone, adjunct or embedded.

Various operations will be described as multiple discrete steps in turn in a manner that is most helpful in understanding the present invention, however, the order of description should not be construed as to imply that these operations are necessarily order dependent. In particular, these operations need not be performed in the order of their presentation.

Figure 1:
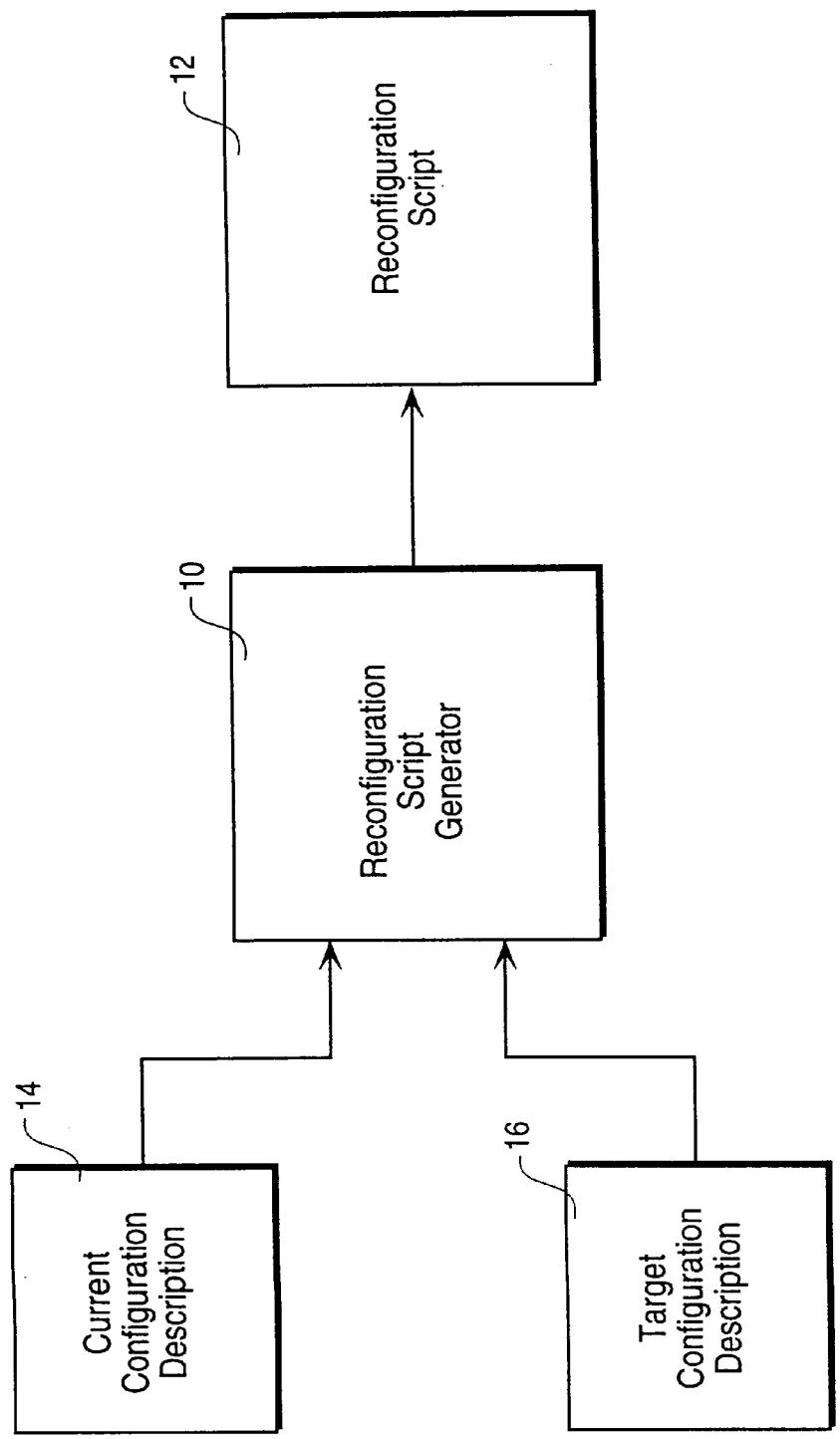
FIG. 1 is a block diagram illustrating the present invention.

Referring now to FIG. 1, wherein a block diagram illustrating the present invention is shown. As illustrated, in accordance with the present invention, reconfiguration script generator 10 is provided to automatically generate reconfiguration script 12 for telecommunication devices of a telecommunication system. Reconfiguration script 12 comprises directly executable configuration commands for deleting/adding features of telecommunication devices, as well as deleting/adding the telecommunication devices (hereinafter, simply devices) from/to the telecommunication system.

Reconfiguration script 12 is generated based on current configuration descriptive image 14 and target configuration descriptive image 16. Current configuration descriptive image 14 specifies the devices and their features included in the current configuration of the telecommunication system, whereas target configuration descriptive image 16 specifies the devices and their features included in the target configuration of the telecommunication system. Two examples, one each, for current and target configuration descriptive images 14 and 16 are illustrated in FIG. 12. In exemplary current and target configuration descriptive images 14 and 16, station 4 is being changed from being the pilot of a directory number hunt (DNH) group to just a member of the DNH group, while station 5 is being changed from a member of the DNH group to being the pilot of the DNH group. Additionally, station 7 is being deleted, while station 8 is being added.

As will be described in more detail below, reconfiguration script generator 10 generates reconfiguration script 12 employing FDG data structures, a device model modeling the telecommunication devices, and deletion/addition linklists. While for ease of explanation, current and target descriptive images 14 and 16 have been described as two separate elements, as will be appreciated by those skilled in the art, the present invention may be practiced with current and target descriptive images 14 and 16 being provided to reconfiguration script generator 10 as two separate descriptive images or as a single combined descriptive image.

Figure 2:
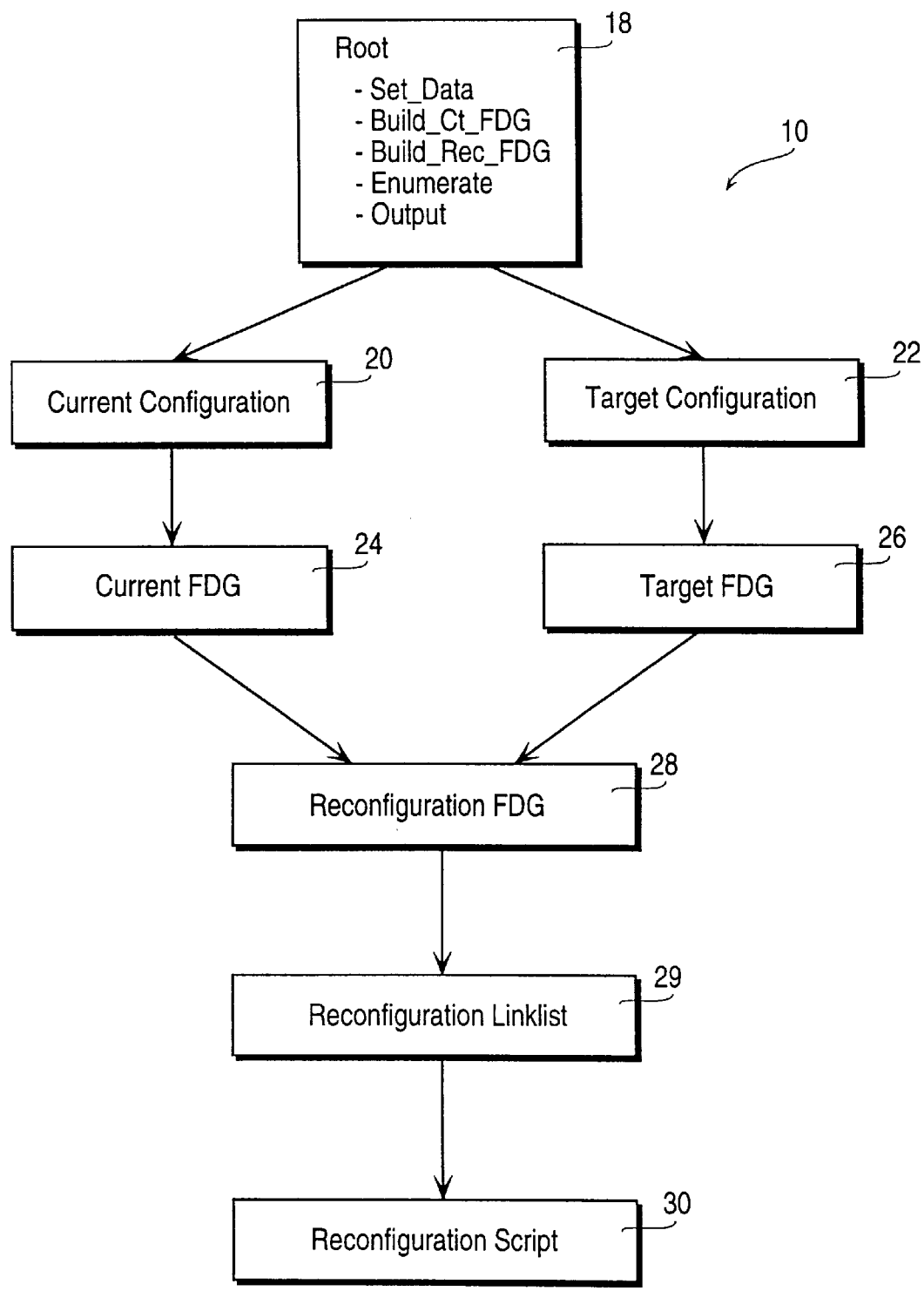
FIG. 2 is a block diagram illustrating one embodiment of the reconfiguration script generator.

Referring now to FIG. 2, wherein a block diagram illustrating one embodiment of reconfiguration script generator 12 is shown. For the illustrated embodiment, reconfiguration script generator 12 comprises a plurality of objects[1], including root 18, current and target configurations 20 and 22, current and target FDGs 24 and 26, reconfiguration FDG 28, reconfiguration linklists 29, and reconfiguration script 30. For the illustrated embodiment, root 18 includes Set_Data, Build_CT_FDG, Build_Rec_FDG, Enumerate and Output methods, and owns objects 20–30. Current and target configurations 20 and 22 hold the current target and configuration data, provided by current and target configuration descriptive images 14 and 16 respectively. Current and target configurations 20 and 22 are created using Set_Data. Current and target FDGs 24 and 26 hold the current and target configuration data complemented with feature scope and dependency data for representing the feature dependencies of the current and target telecommunication devices, i.e., telecommunication devices of the current and target configurations, in accordance with graph theory. Current and target FDGs 24 and 26 are created using Build_CT_FDG. Reconfiguration FDG 28 hold the reconfiguration data complemented with feature scope and dependency data for representing the feature dependencies of the impacted features of the impacted telecommunication devices, in accordance with graph theory. Reconfiguration FDG 28 is created using Build_Rec_FDG. Reconfiguration linklists 29 are ordered lists of the deletion and addition actions that need to be taken to reconfigure the telecommunication system from the current configuration to the desired target configuration. Reconfiguration linklists 29 are created using Enumerate. Reconfiguration script 30 contains the executable configuration commands to reconfigure the telecommunication system from the current configuration to the desired target configuration. Reconfiguration script 30 is created using Output.

[1]The term "object" is used herein to mean a software entity that includes data and methods that operate on the data, as it is understood by those skilled in the art of object oriented programming.

Figure 3:
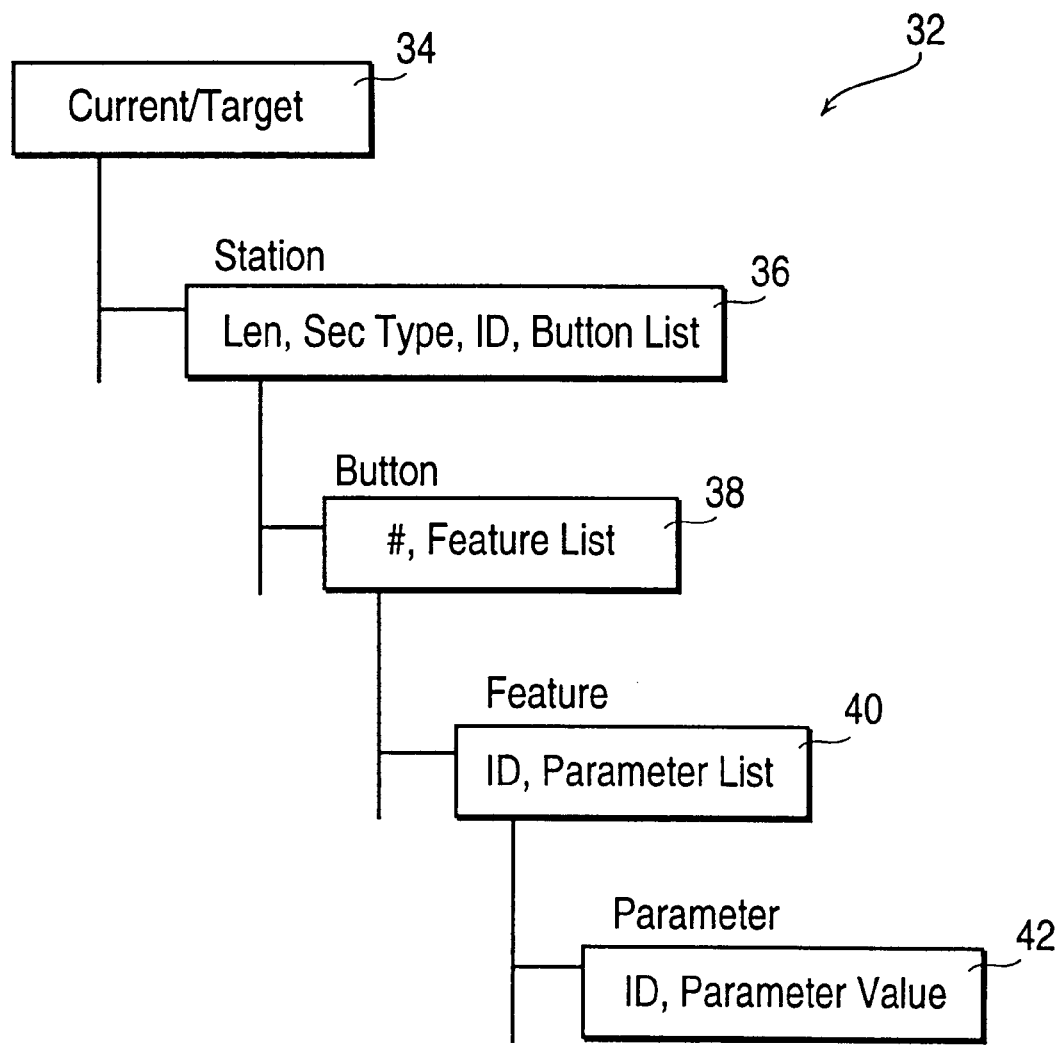
FIG. 3 is a block diagram illustrating one embodiment of the current/target data structure.

Referring now to FIG. 3, wherein a block diagram illustrating one embodiment of a data structure suitable for implementing current/target configuration 20 or 22 is shown. For the illustrated embodiment, data structure 32 includes name field 34 for identifying whether data structure 32 holds current or target configuration data. Data structure 32 further includes station field 36, where each instance holds the basic data, such as device or set type, identification, and so forth, for a telecommunication device, such as a telephone set, also referred to as a telephone station. Data structure 32 further includes button field 38, where each instance holds the button number, and its feature list for a button instance. Data structure 32 further includes feature field 40, where each instance holds the feature identification, and its parameter list for a feature instance. Lastly, data structure 32 further includes parameter field 42, where each instance holds the parameter identification, and its parameter value for a parameter instance.

Figure 4:
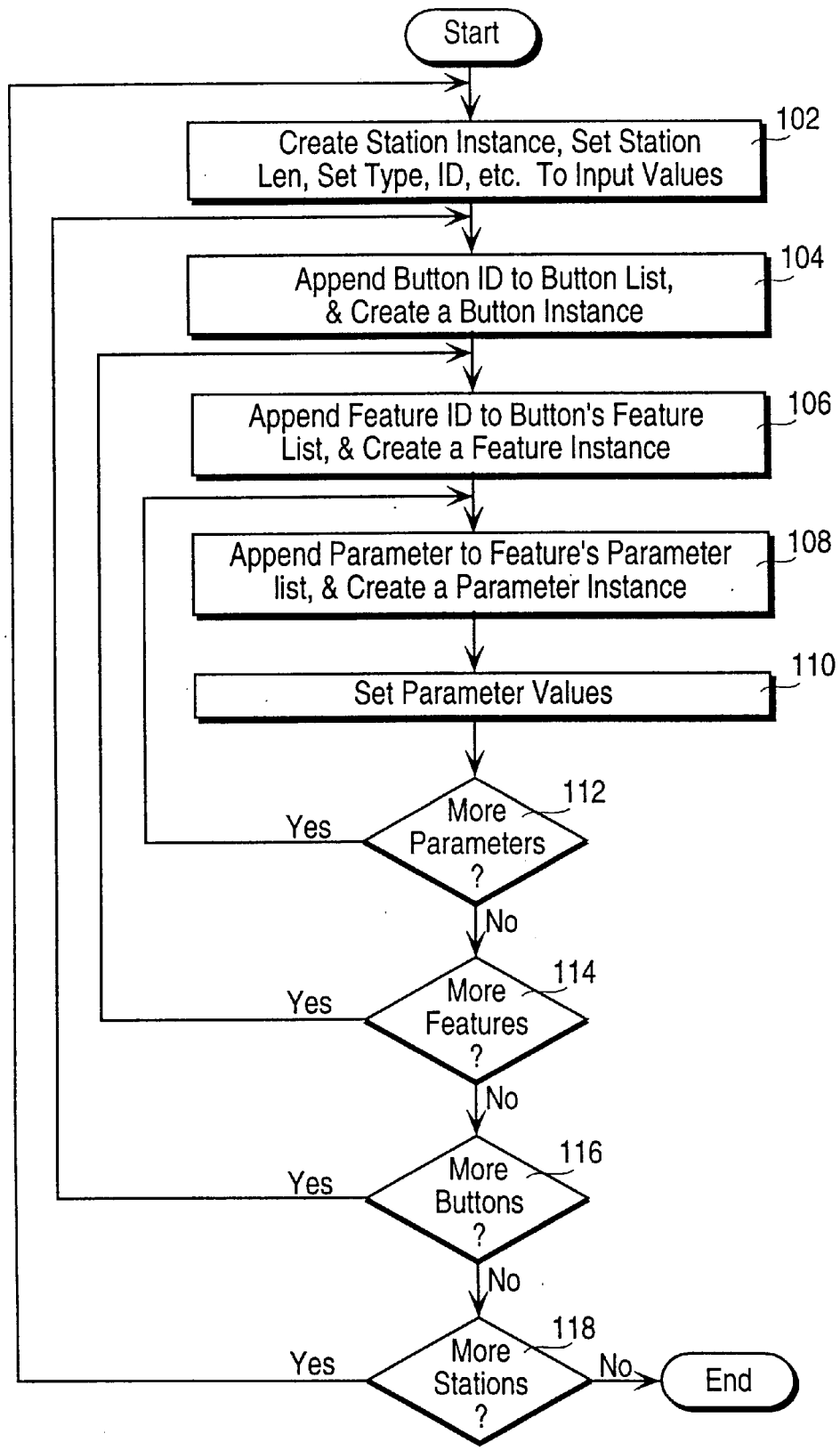
FIG. 4 is a flow diagram illustrating one embodiment of the method steps for loading data into the current/target data structure.

FIG. 4 illustrates the operational flow for one embodiment of Set_Data. As shown, for the illustrated embodiment, upon invocation, Set_Data reads current/target configuration descriptive image 14 or 16, and locates a station. Upon locating a station, Set_Data sets a station instance with its basic data, as provided by current/target configuration descriptive image 14 or 16, step 102. Next, Set_Data locates a button of the station. Upon locating a button, Set_Data appends the button's identification to the button list of the station, and create a button instance, step 104. Set_Data then locates a feature of the button. Upon locating a feature, Set_Data appends the feature's identification to the feature list of the button, and create a feature instance, step 106. Set_Data then locates a parameter of the feature. Upon locating a parameter, Set_Data append the parameter's identification to the parameter list of the feature, and create a parameter instance, step 108. Set_Data then locates the parameter's value, and set the parameter instance with the located parameter value, step 110.

Set_Data then looks for more parameters of the feature, step 112, and repeats steps 108–112 until all parameter instances for the feature have been created and their values set. Set_Data then looks for more features of the button, step 114, and repeats steps 106–114 until all feature instances for the button have been created and their parameter values for all parameters set. Set_Data then looks for more buttons of the station, step 116, and repeats steps 104–116 until all button instances for the station have been created, and their feature as well as parameter instances created, and values set. Set_Data then looks for more stations, step 118, and repeats steps 102–118, i.e. the entire process, until all station instances have been created, including all button, feature, and parameter instances, and parameter values.

Figure 5:
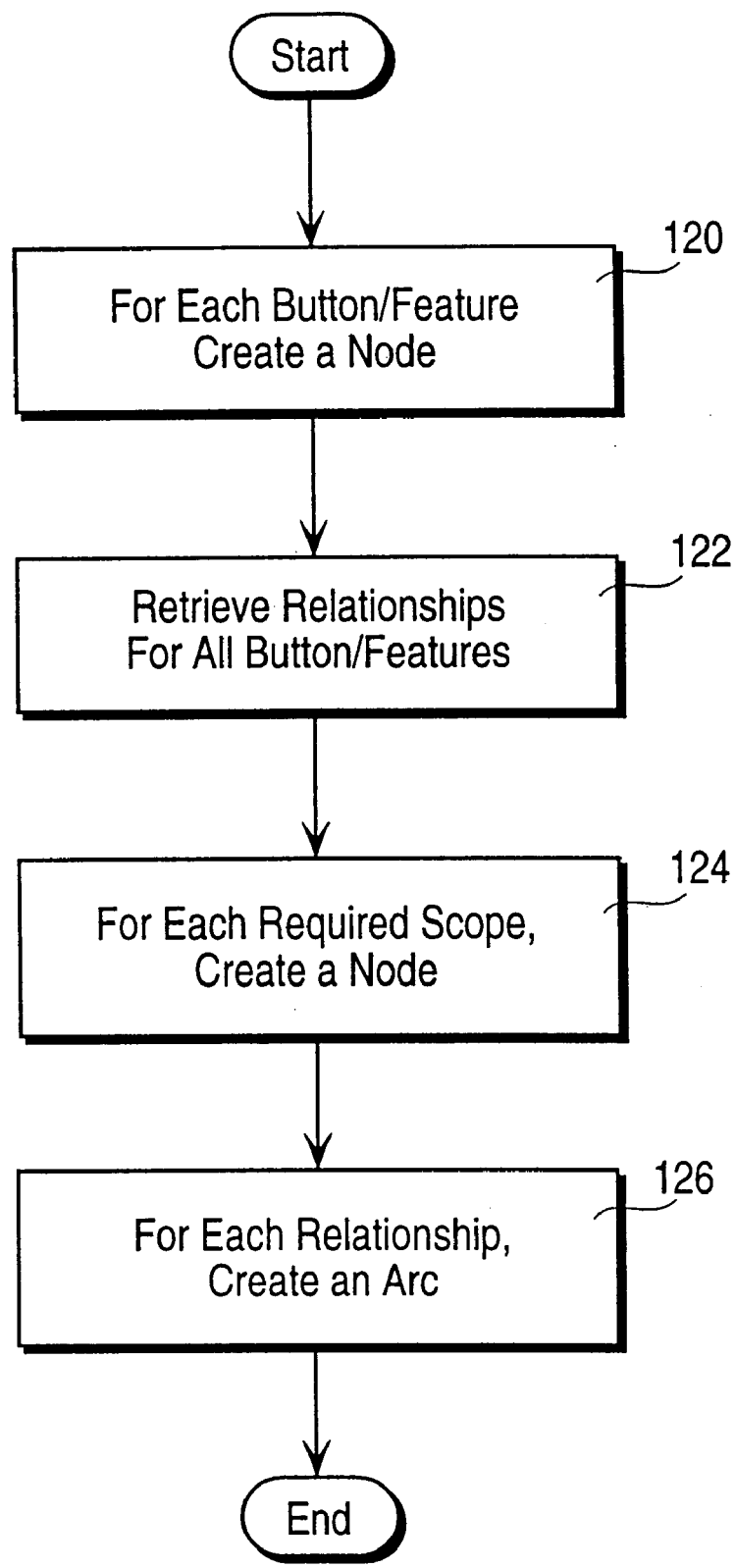
FIG. 5 is a flow diagram illustrating one embodiment of the method steps for creating the current/target FDG data structure.

FIG. 5 illustrates the operational flow for one embodiment of Build_CT_FDG. As shown, for the illustrated embodiment, upon invocation, Build_CT_FDG reads data held in current/target configuration 20 or 22, and for each button/feature, Build_CT_FDG creates a node, step 120. Build_CT_FDG then retrieve feature dependency relationships for all buttons and features from a device model modeling the rules and behaviors of the telecommunication devices, step 122. Then, for each required feature scope to enforce feature dependency, Build_CT_FDG also creates a node, step 124. Lastly, for each feature dependency relationship, Build_CT_FDG creates an arc, step 126.

Figure 24:
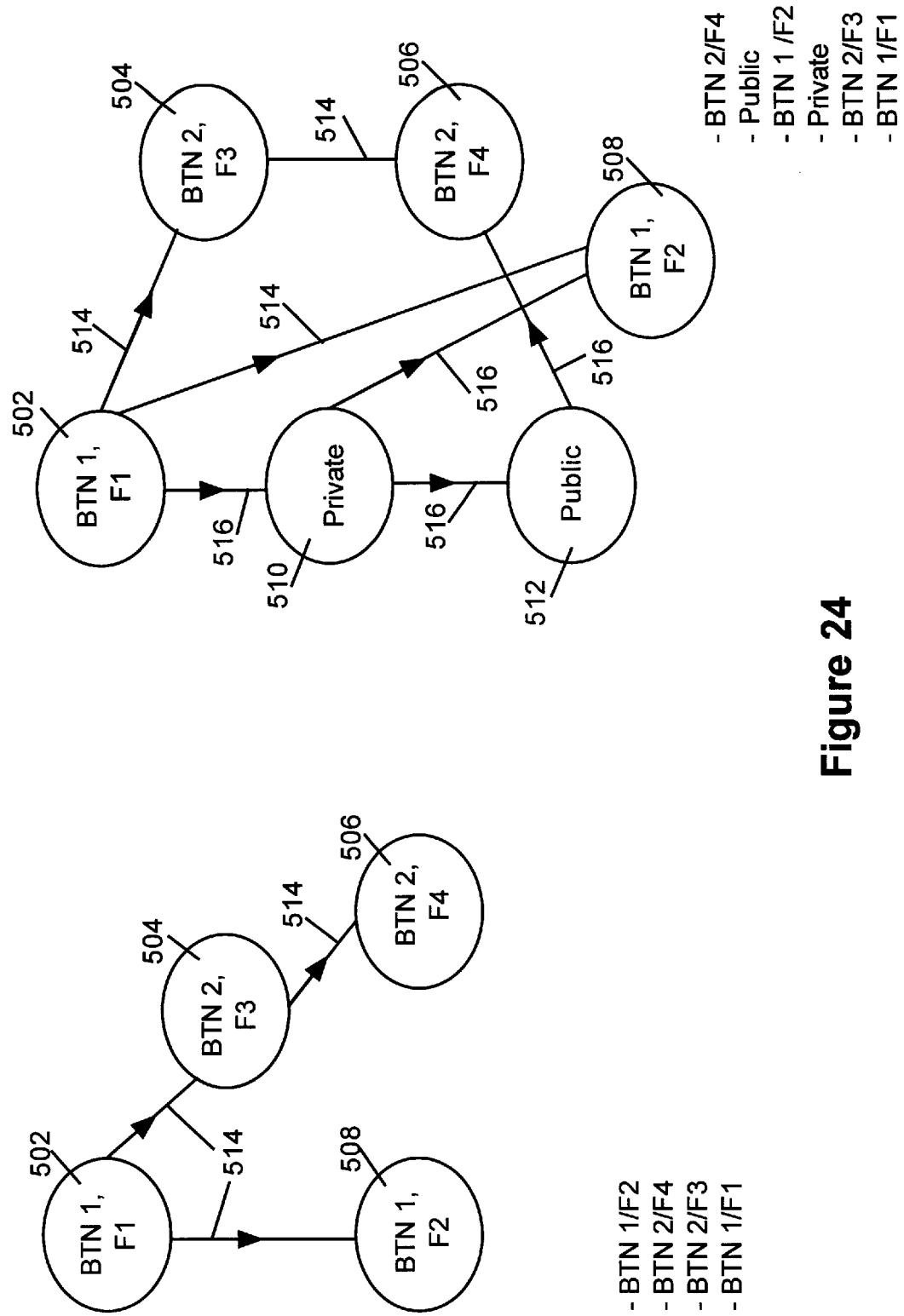
FIG. 24 illustrates the concept and necessity for scope nodes.

An exemplary approach for modeling the rules and behaviors of the telecommunication devices is disclosed in the above identified copending U.S. Patent Application. FIG. 24 illustrates the concept and the necessity for feature scopes. At the left, two features of two buttons (represented as nodes 502–508), including their feature dependencies (represented as arcs 514) are illustrated. Employing a left-to-right depth first approach, the order of removal of the four button features are as shown, i.e. button 1/feature 2, button 2/feature 4, button 2/feature 3, and button 1/feature 1. However, if the graph is altered with the addition of the private and public scope nodes 510 and 512, and feature dependency arcs 516, the order of removal, using the same traversal technique, would be as shown, button 2/feature 4, public, button 1/feature 2, private, button 2/feature 3, and button 1/feature 1. Note that the order of removal for button 1/feature 2 and button 2/feature 4 have been swapped. As appreciated by those skilled in the art, while sometimes telecommunication device features do not have explicit feature dependencies on each other, they nevertheless have certain order requirement between them. For example, while the feature 3-way conferencing (3WC) is not exactly "feature dependent" on telephone number, nevertheless 3WC must be removed prior to removing a telephone number assigned to a set. Thus, to maintain the order, the present invention employs the above described feature scopes. Two examples, one each, of the current and target FDGs are illustrated in FIGS. 13–15 and FIGS. 16–18 respectively. The two exemplary FDGs are current and target FDGs for the exemplary current and target configuration image of FIG. 12. Note that the current and target FDGs presented are for illustration purposes only. For the illustrated embodiment, reconfiguration script generator 10 maintains the data for these FDGs in FDG data structures, but does not actually render the FDGs, as the actual rendering are unnecessary for the automated process of the present invention. Of course, for alternative embodiments, the actual rendering may be performed for usability or other purposes.

Figure 6:
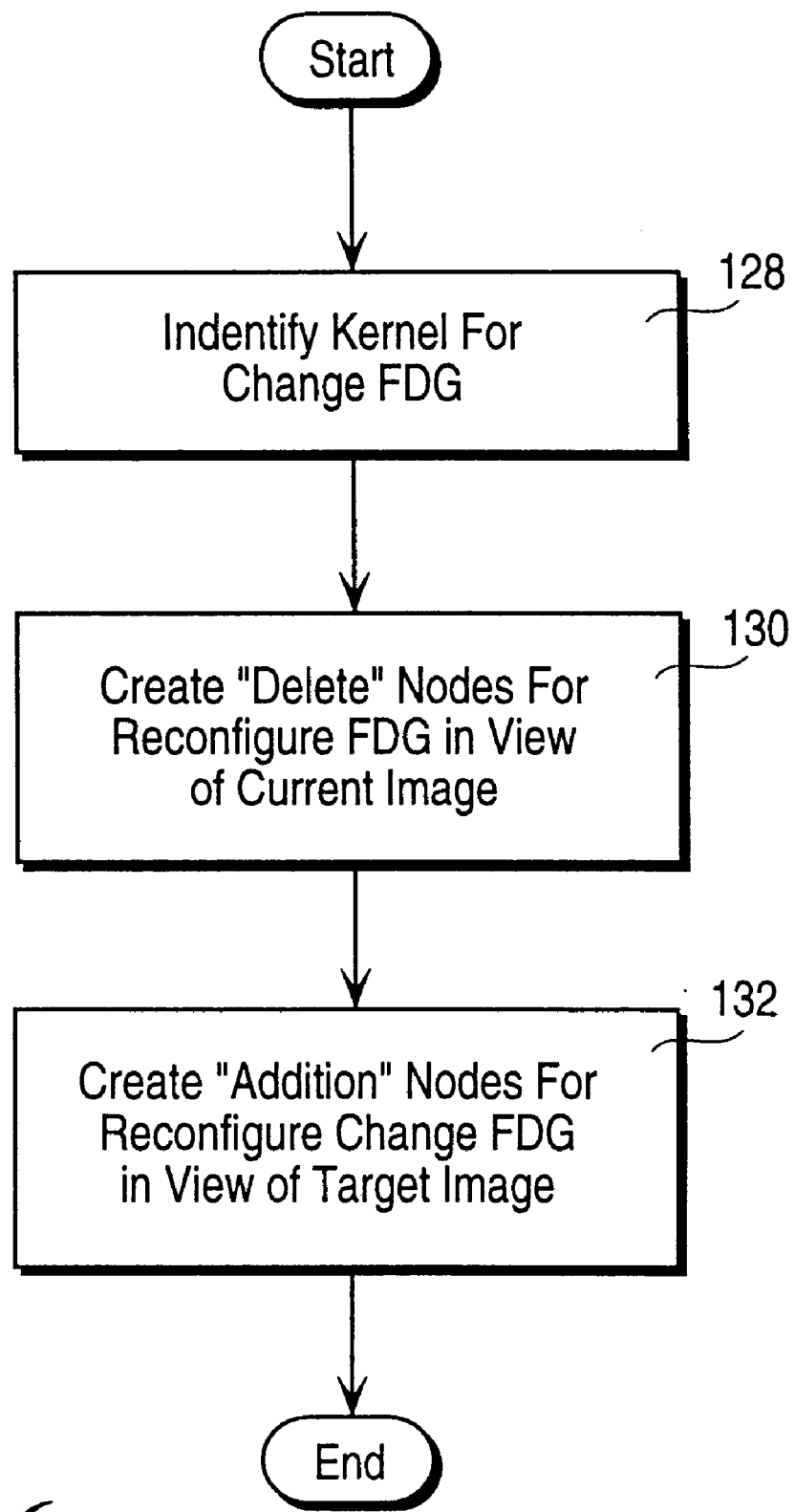
FIG. 6 is a flow diagram illustrating one embodiment of the method steps for creating the reconfiguration FDG data structure.
Figure 25:
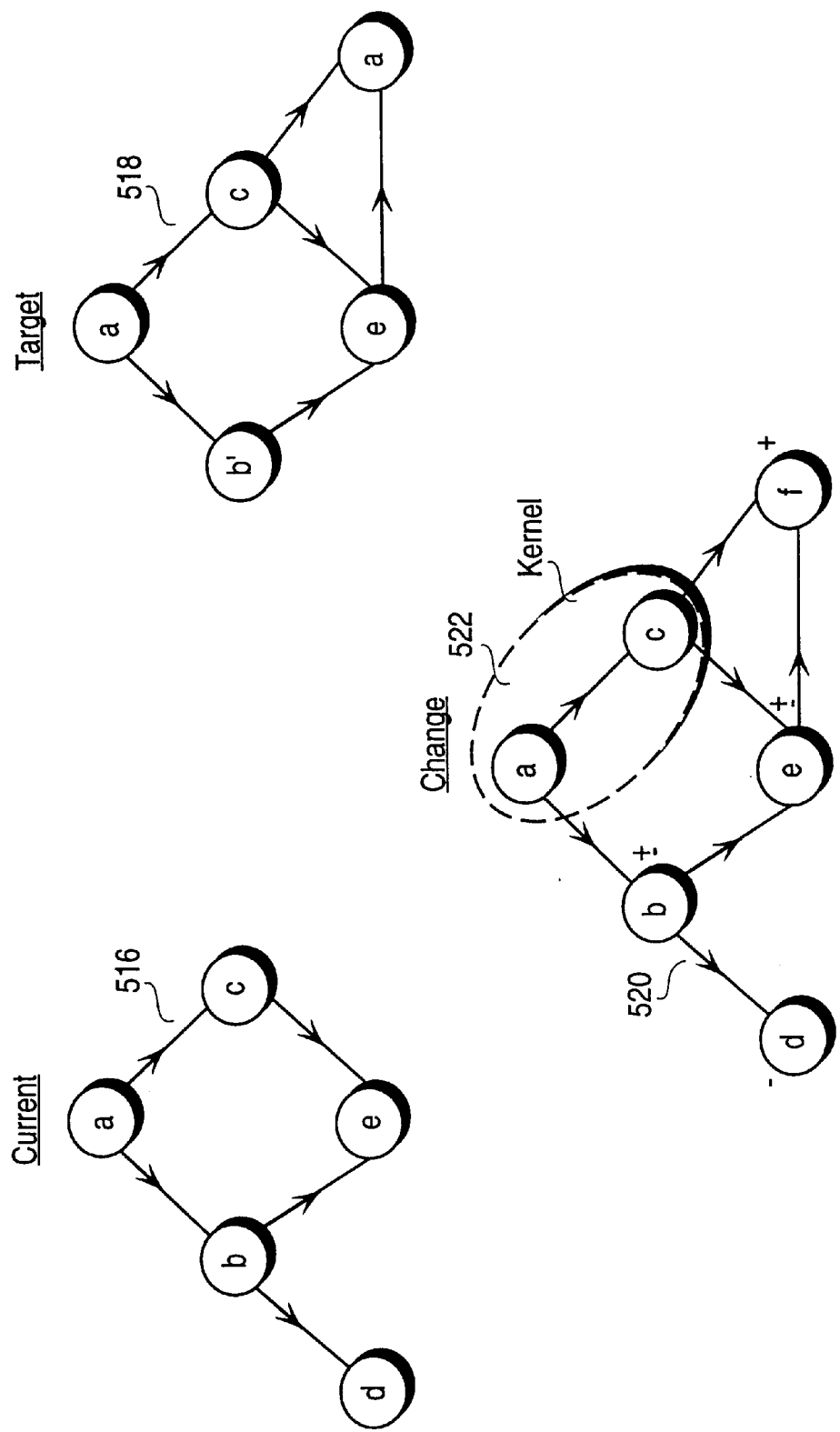
FIG. 25 illustrated the concept of a kernel for the current and target FDGs.

Referring now to FIG. 6, wherein a flow diagram illustrating one embodiment of the method steps of Build_Rec_FDG is shown. For the illustrated embodiment, upon being invoked, Build_Rec_FDG compares the current and target FDGs, and identifies a kernel section of the two FDGs that require no configuration action, i.e. neither deletion nor addition of a feature, step 128. The kernel section of the two FDGs is the section comprising "unimpacted" feature nodes emanating from the root node. An "unimpacted" feature node is a node not being modified nor dependent on a node being modified. The kernel section may be identified using any one of a number of graph comparison techniques. Skipping now to FIG. 25, wherein a block diagram illustrating the concept of kernel is shown. Illustrated at the top half of the figure are two sample current and target FDGs 516 and 518. Illustrated at the lower half of the figure is a sample reconfigure FDG 520. Current FDG 516 includes nodes a through e, whereas target FDG 518 includes nodes a, b', c, e and f. In other words, b is being modified; d is being deleted; and f is being added. To modify b, e has to removed and added back later, by virtue of its dependency on b. Therefore, a and c (emanating from a) are the only nodes "unimpacted". Thus, kernel section 522 comprises of nodes a and c.

Returning now to FIG. 6, once the kernel section of the current and target FDGs 24 and 26 have been identified, Build_Rec_FDG creates the "delete" nodes (annotated with the "−" sign in subsequent figures) for reconfigure FDG 28 in view of current FDG 24, step 130. Recall from the earlier discussion, these "delete" nodes are the nodes of current FDG 24 that are "outside" of the kernel, and includes those that are temporarily deleted to allow changes to be made to their predecessor nodes. Next, Build_Rec_FDG creates the "addition" nodes (annotated with the "+" sign in the subsequent figures) for reconfigure FDG 28 in view of target FDG 26, step 132. Similarly, "addition" nodes are the nodes of target FDG 26 that are "outside" of the kernel. However, nodes that already exist as "delete" nodes are not duplicated, but reannotated as "change" nodes (annotated with both the "+" and "−" signs in subsequent figures).

Figure 19:
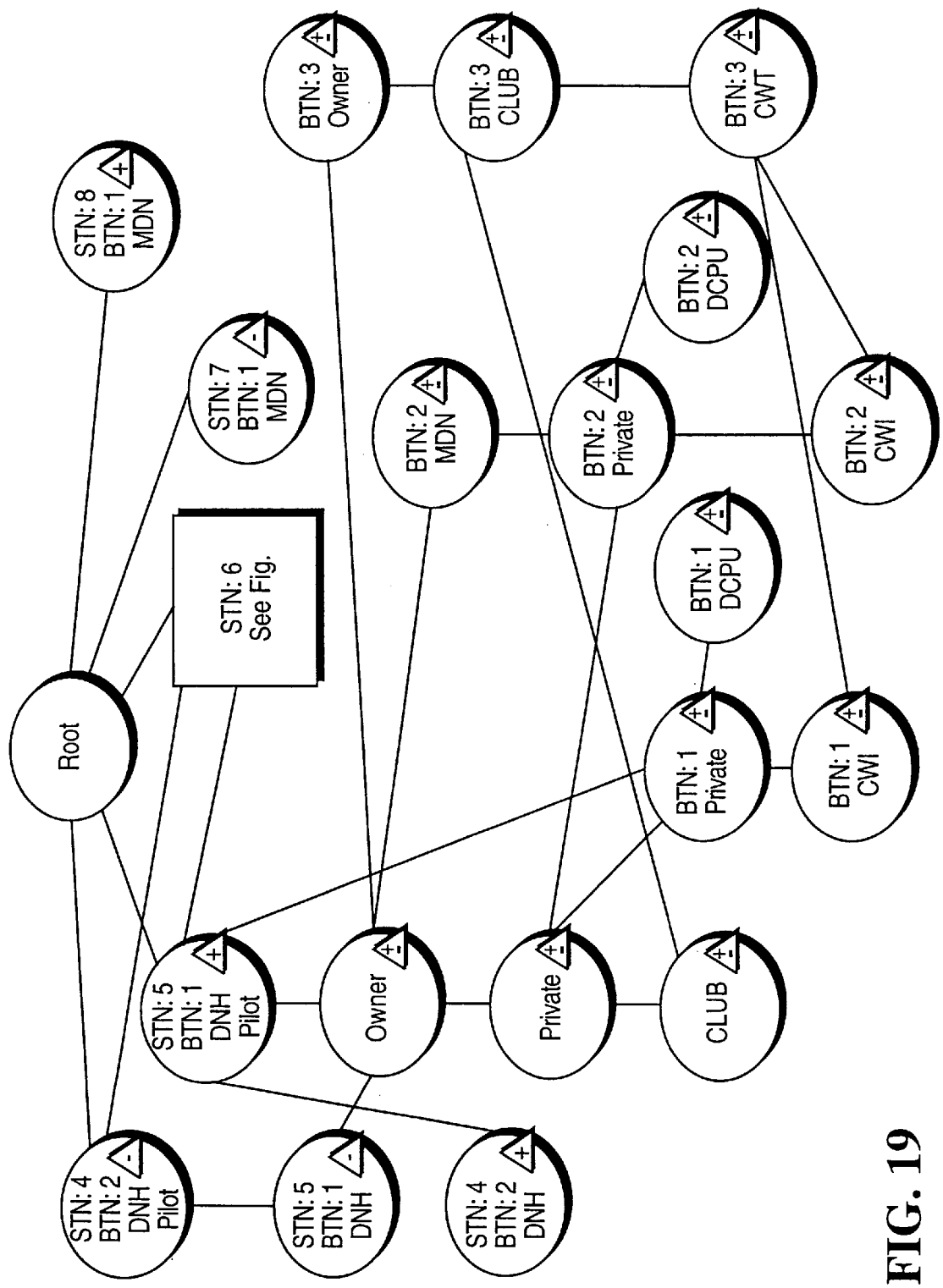
FIGS. 19–20 illustrate the reconfiguration FDG derived from the current and target FDGs of FIGS. 13–18.
Figure 20:
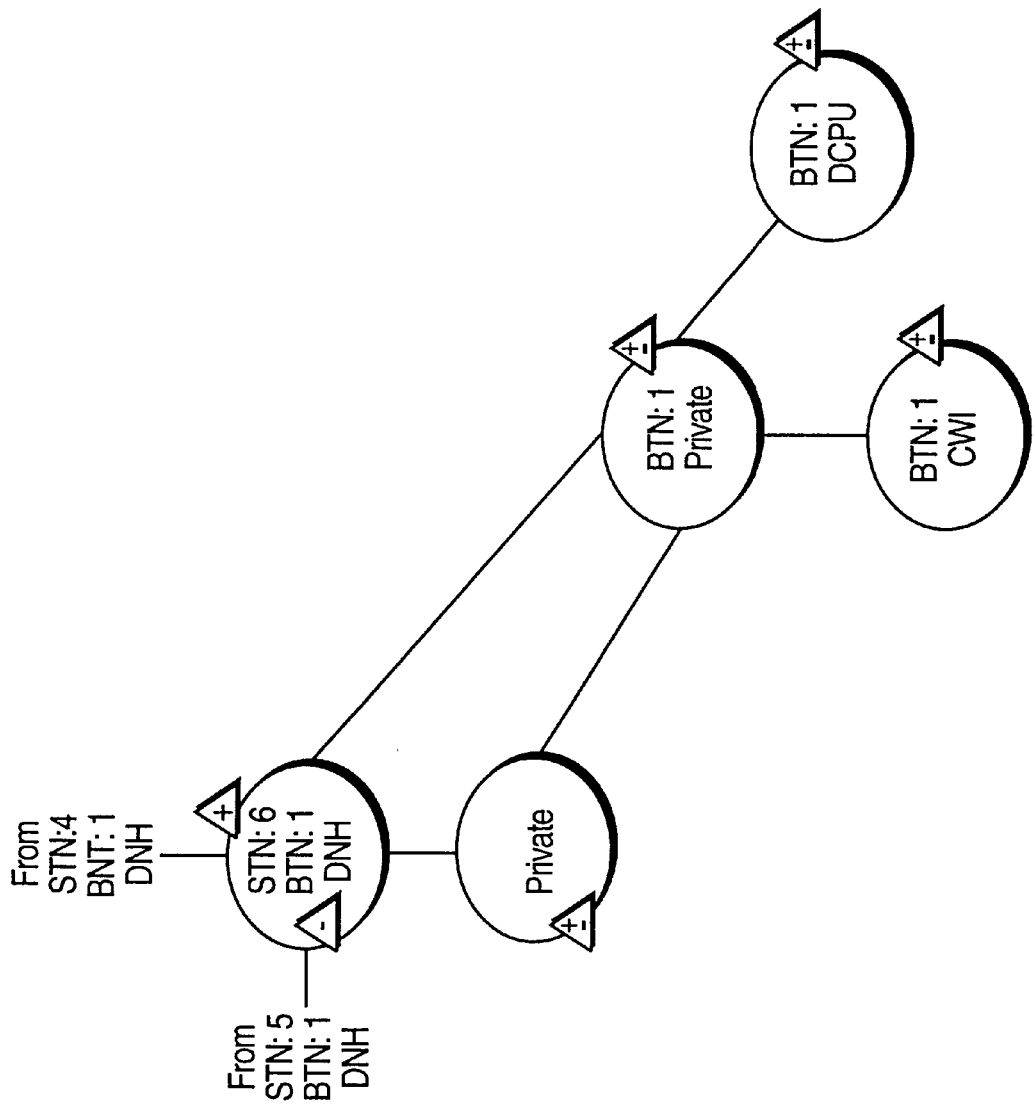

An exemplary reconfiguration FDG is illustrated in FIGS. 19–20. The exemplary reconfiguration FDG is build by Build_Rec_FDG, based on the exemplary current and target FDGs of FIGS. 13–15 and FIGS. 16–18. Similarly, note that the reconfiguration FDG is presented for illustration purpose only. For the illustrated embodiment, reconfiguration script generator 10 maintains the data for the reconfiguration FDGs in a FDG data structure, but does not actually render the FDG, as the actual rendering are unnecessary for the automated process of the present invention. Of course, for alternative embodiments, the actual rendering may be performed for usability or other purposes.

Figure 7:
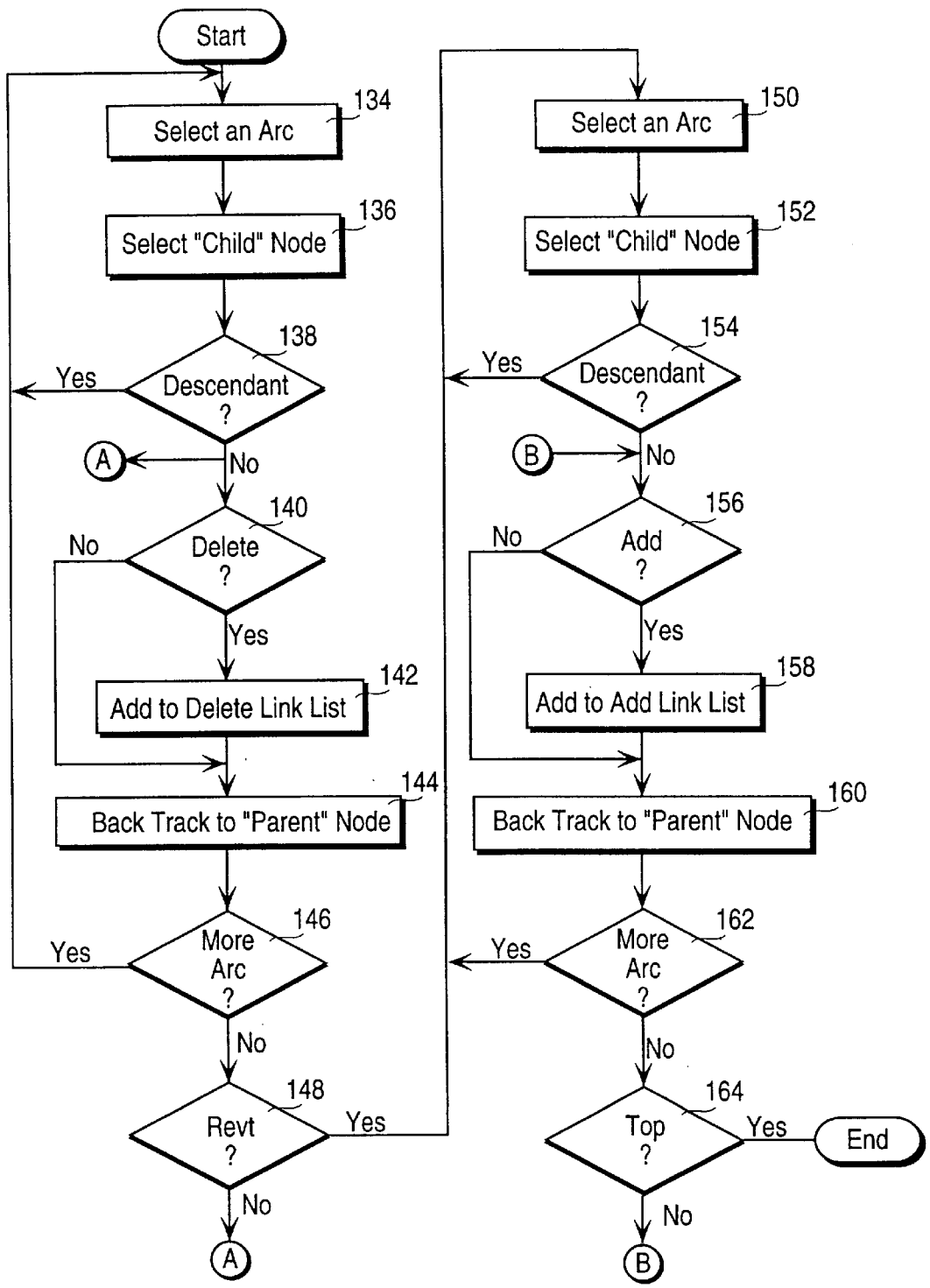
FIG. 7 is a block diagram illustrating one embodiment of the method steps for creating the deletion/addition linklists.
Figure 21:
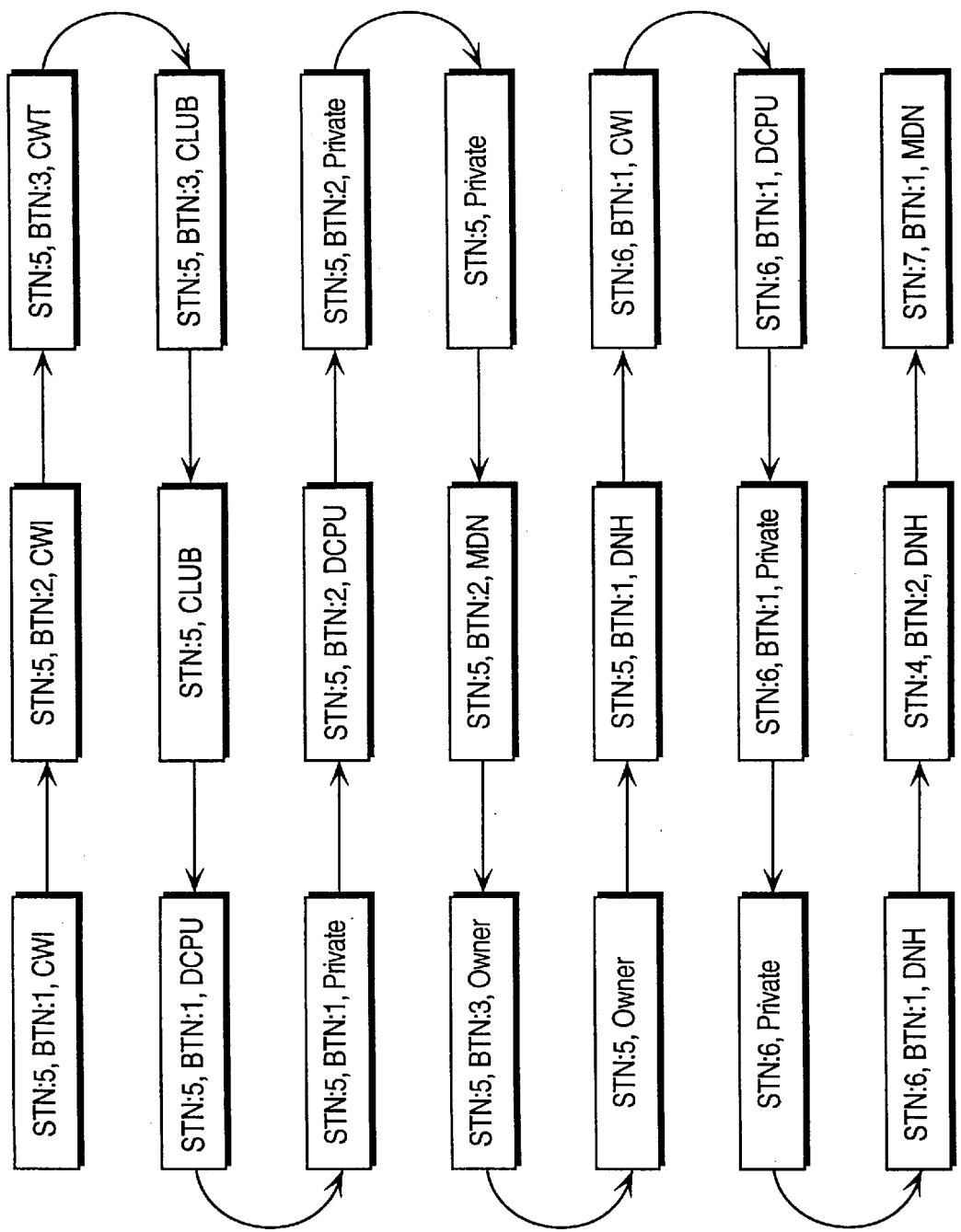
FIGS. 21–22 illustrate the deletion and addition linklists generated per the reconfiguration FDG of FIGS. 19–20.
Figure 22:
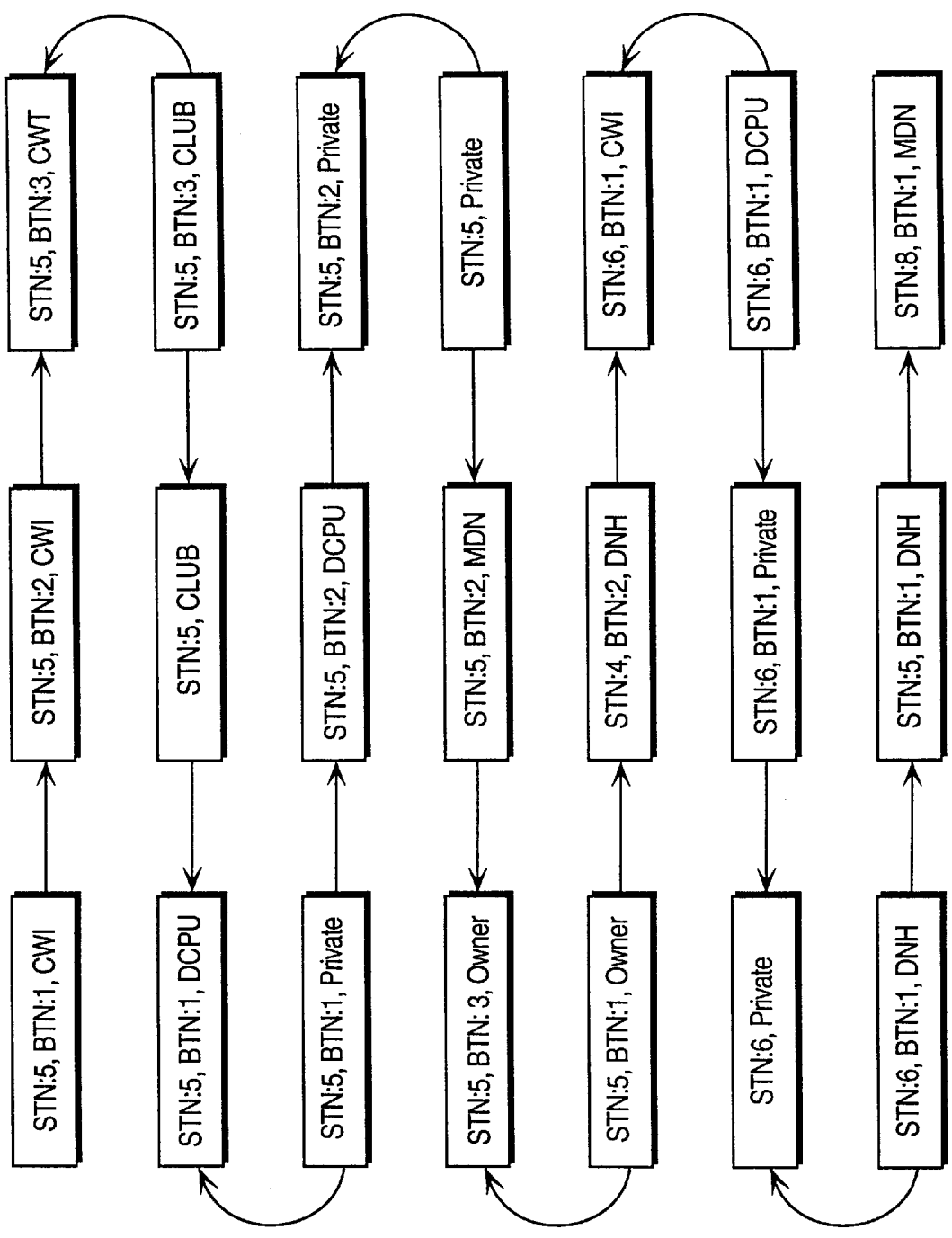

Referring now to FIG. 7, wherein a flow diagram illustrating the method steps of one embodiment of Enumerate is shown. For the illustrated embodiment, Enumerate traverses reconfiguration FDG 28, first generating the entries for the "deletion" linklist, then the entries for the "addition" linklist. Two examples, one each, for the "deletion" and "addition" linklists are shown in FIGS. 21 and 22. These are linklists generated by Enumerate based on the exemplary reconfiguration FDG of FIGS. 19 and 20.

Upon being invoked, Enumerate starts with the root node, and selects a dependency arc and the dependent node at the end of the arc (also referred to as the "child" node), steps 134 and 136. Enumerate determines if the "child" node has descendant nodes, step 138. Enumerate repeats steps 134–138 until a "child" node without descendant node is reached (also referred to as a "leaf" node). Upon locating the "leaf" node, Enumerate determines if the node is to be deleted, step 140. If so, Enumerate adds the node to the "delete" linklist, step 142, otherwise Enumerate proceeds directly to step 144.

At step 144, Enumerate backtracks to the "parent" node. Enumerate determines if the "parent" node has more dependency arcs, step 146. If so, Enumerate returns to step 134 and proceeds as described earlier. Otherwise, Enumerate determines if the "parent" node is the root node, step 148. If the "parent" node is not the root node, Enumerate returns to step 140 and proceeds as described, otherwise Enumerate proceeds to perform steps 150–164.

Steps 150–164 are similar to steps 134–148 except Enumerate is looking for nodes to be added, and generating entries for the "addition" linklist.

While the present invention has been described with the employment of separate "deletion" and "addition" linklists, with the "deletion" linklist being generated first, as will be appreciated by those skilled in the art, the number of linklists and their order of generation are merely for illustrative purpose only. The present invention may be practiced with the "addition" linklist being generated first, and/or using only a single combined linklist.

Figure 8:
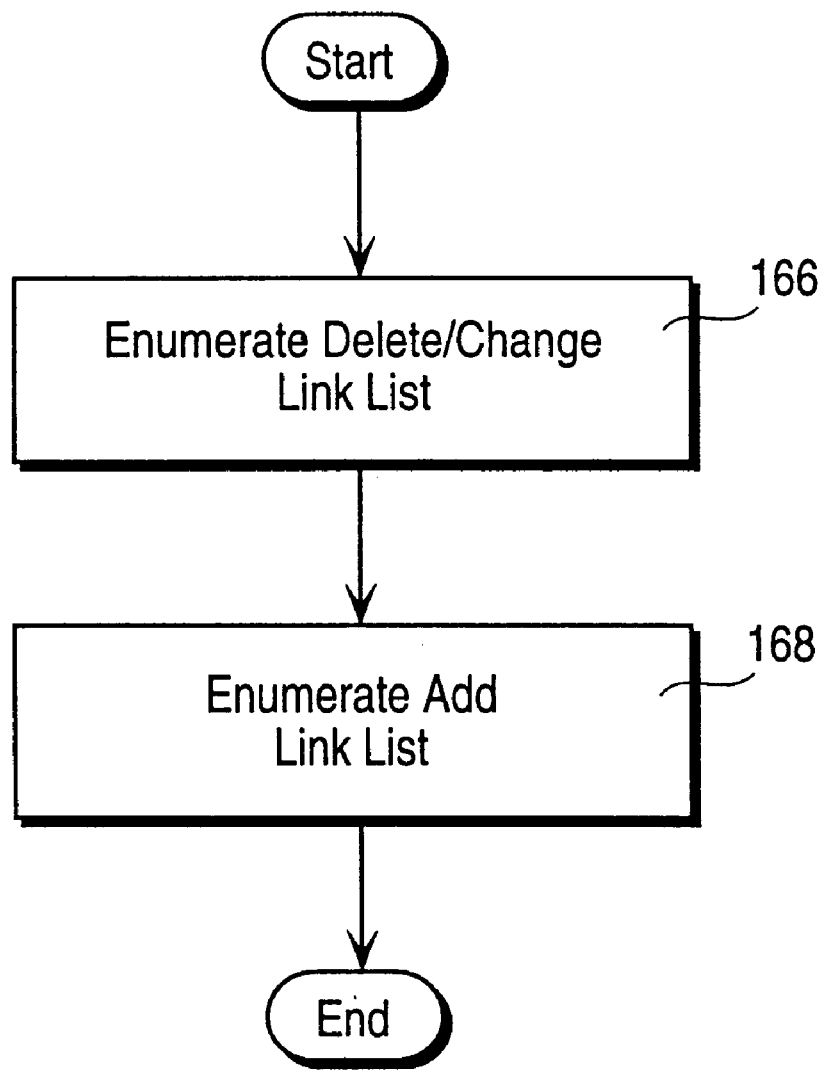
FIG. 8 is a block diagram illustrating one embodiment of the method steps for generating the reconfiguration script.

Referring now to FIG. 8, wherein a flow diagram illustrating the method steps of one embodiment of Output is shown. For the illustrated embodiment, Output first generates the executable configuration commands for the deletion actions. For the illustrated embodiment, non-executable configuration commands are also generated as "commentary" for the feature scope nodes that are to be "deleted" and "added". Recall, the feature scopes are not "real" features of the telecommunication devices. They are merely inserted in the FDGs to enforce certain implicit dependency between the features. An exemplary reconfiguration script having a number executable configuration commands (as well as non-executable pseudo configuration commands) is shown in FIG. 23. These executable/nonexecutable (pseudo) configuration commands are generated by Output based on the exemplary linklists of FIGS. 21 and 22.

Figure 9:
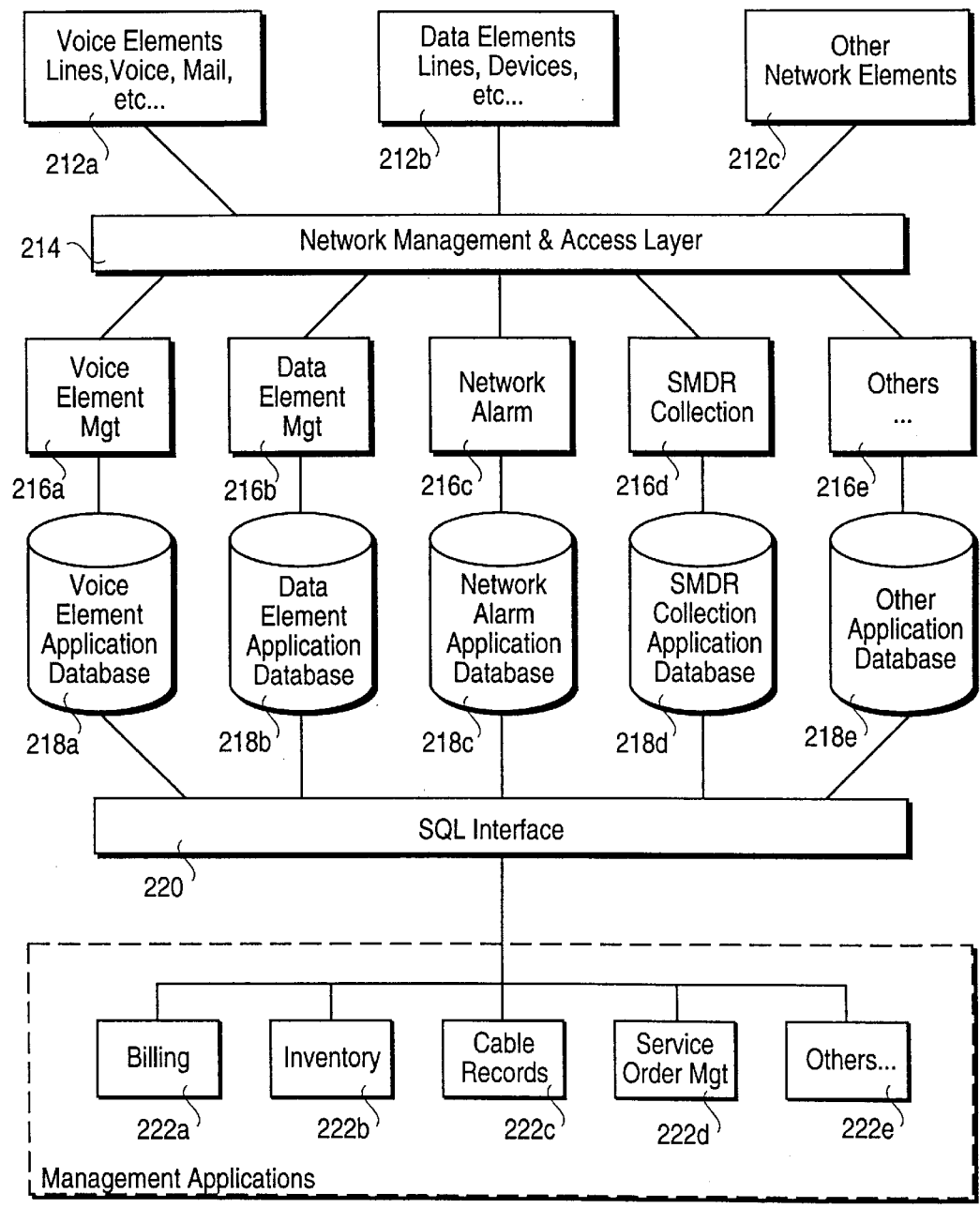
FIG. 9 is a block diagram illustrating an architecture for an integrated telecommunication network management system suitable for practicing the present invention.

Referring now to FIG. 9, wherein a block diagram illustrating an architecture of an integrated telecommunication network management system suitable for practicing the present invention is shown. The network elements, such as voice elements 212a, data elements 212b, and other elements 212c, are accessed through a network management and access layer 214. Particular examples of voice, data, and other elements 212a–212c include telephone services, provisioning, adding or deleting telephone options, trunk lines, provisions of bandwidth for Wide Area Network applications, and service control points. The network management and access layer 214 implements the specific device protocols, thereby freeing the core of the management software from such device details. The software core is typically organized into a number of subsystems 216a–216e, with each subsystem dedicated to managing a "family" of network elements, such as voice elements, data elements, network alarms, and Station Message Detail Recording (SMDR) collections. Typically, each subsystem also has its own databases 218a–218e for storing various profile, operational, and management data. In particular, these data include device type models where the various network devices being managed are modeled. The various management subsystems 216a–216e use the model data to emulate network devices when interpreting user or system actions. Additionally, the data are accessed by various management applications 222a–222e, such as billing, inventory, cable records, and service orders, through a database interface such as a Structured Query Language (SQL) interface.

There are many variations on how these elements 212a–212c, 214, 216a–216e, 218a–218e, 220, and 222a–222e are architecturally arranged. In some variations, the functions provided by some of these elements are combined, while in other variations, the functions provided by these elements may be further subdivided. The architecture illustrated is intended to be representative of a broad category of integrated telecommunication network management systems where device modeling and emulation is employed for performance and extendibility.

Figure 10:
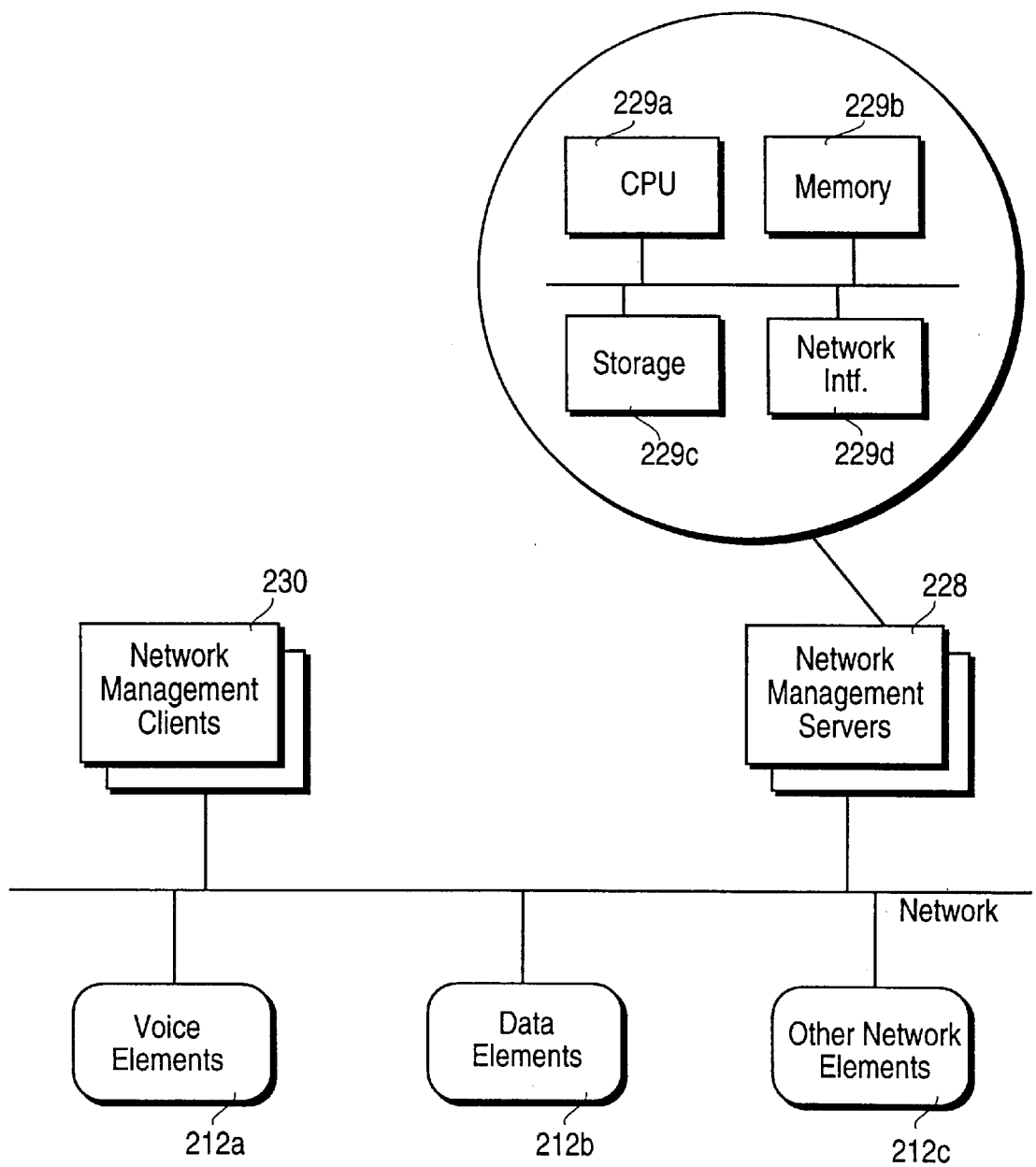
FIG. 10 is a block diagram illustrating a system view of a network of telecommunication devices incorporated with the integrated telecommunication network management system of FIG. 9.

FIG. 10, a block diagram, illustrates an exemplary telecommunication network system incorporating the integrated network management system of FIG. 9. The exemplary telecommunication network system 224 is comprised of a number of voice elements 212a, a number of data elements 212b, and a number of other elements 212c, connected to each other through a network 226. Particular examples of suitable networks include telephone company deployed voice and data service networks for business customers or hybrid networks that are built by large end-users of telecommunication services. Additionally, the exemplary network 224 further comprises a number of servers 228 executing the network management and access layer and the back end portions of the management subsystems and applications, and storing some portions of the system databases described earlier. Particular examples of suitable servers include workstations with non-proprietary operating systems like UNIX or proprietary network operating systems, that execute file retrieval and database record retrieval processes. In one embodiment, server 228 includes processor 229a, memory 229b, storage 229c and network interface 229d coupled to each other as shown. These elements perform their conventional function of processing, storage, interfacing, and so forth. Furthermore, the exemplary network 224 comprises a number of clients 228 executing the front end portions of the subsystem and applications, and storing the remaining portions of the system databases described earlier. Particular examples of suitable clients include DOS and Windows client applications or any program executing on a workstation accessing or storing information on the servers. Network management users manage the network through the clients 230, which accomplish the management functions in cooperation with the servers 228.

While a distributed telecommunication network system is being illustrated as being suitable for practicing the present invention, as will be appreciated by those skill in the art, the present invention may also be practiced with a centralized telecommunication network system.

Figure 11:
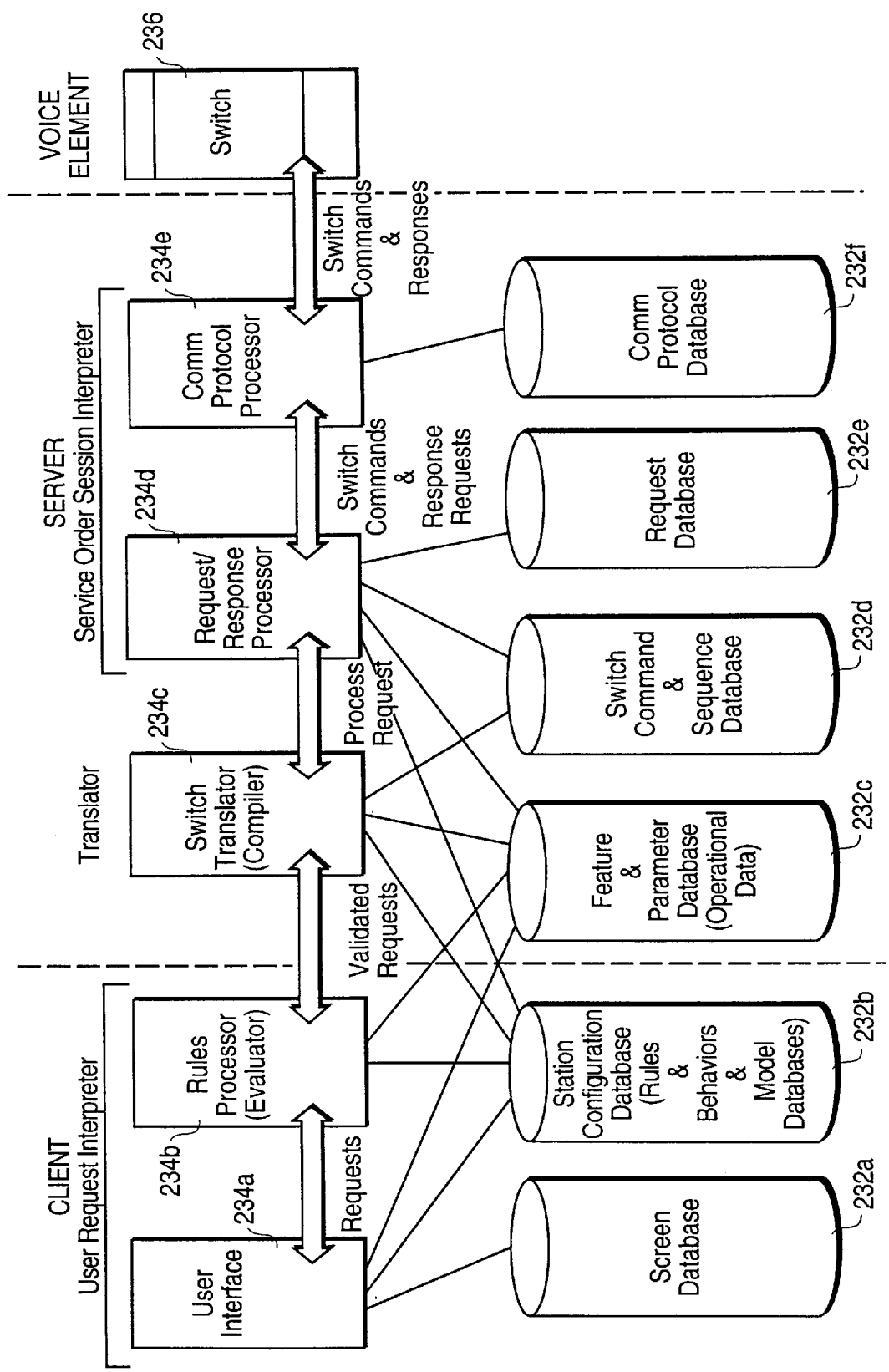
FIG. 11 is a block diagram illustrating selected portions of one embodiment of the network management and access layer, the voice element management subsystem, and the voice element management databases of FIG. 9 in further detail.
Figure 13:
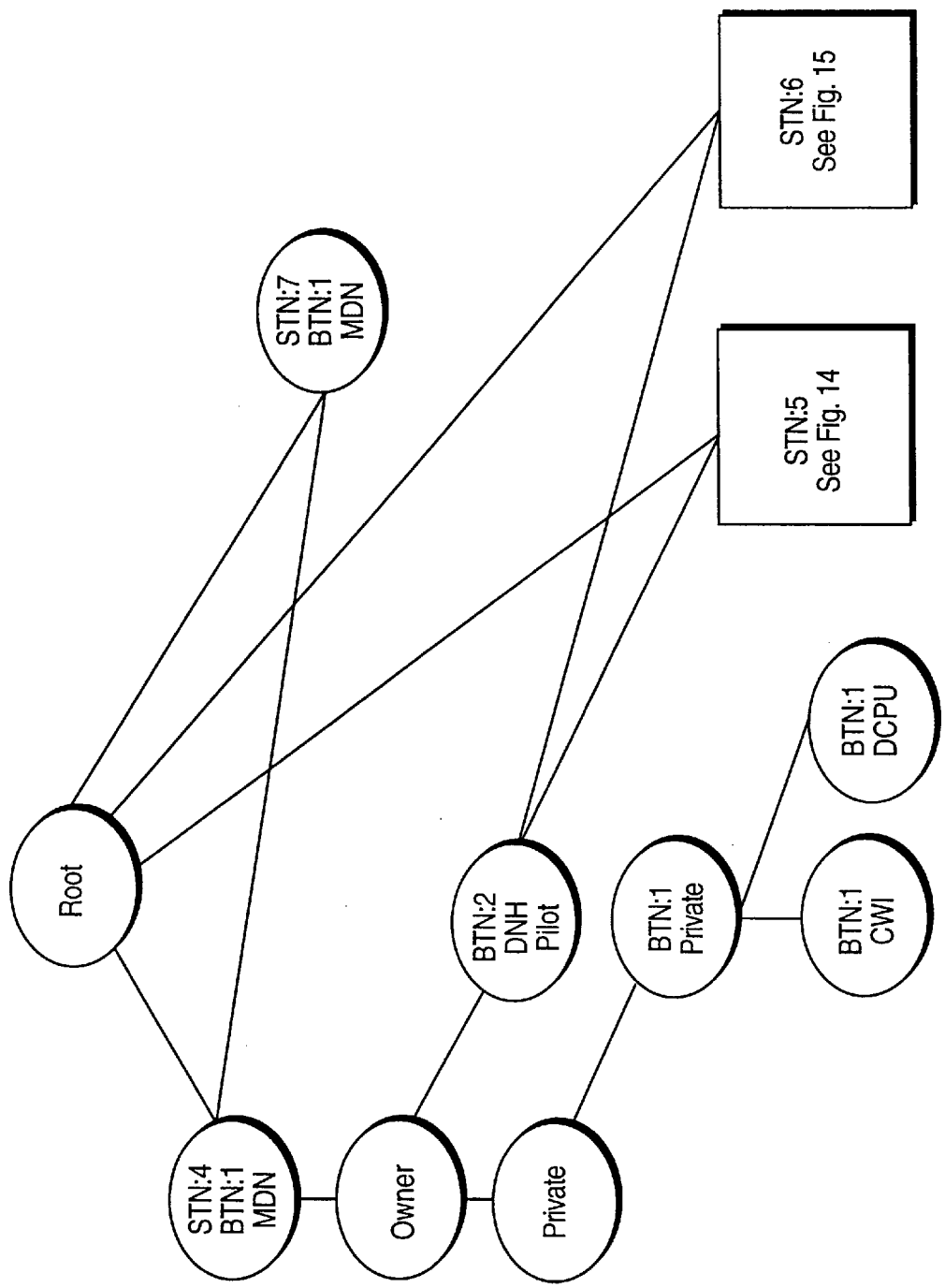
FIGS. 13–15 and 16–18 illustrate the current and the target FDG for the sample current image of FIG. 12 respectively.
Figure 14:
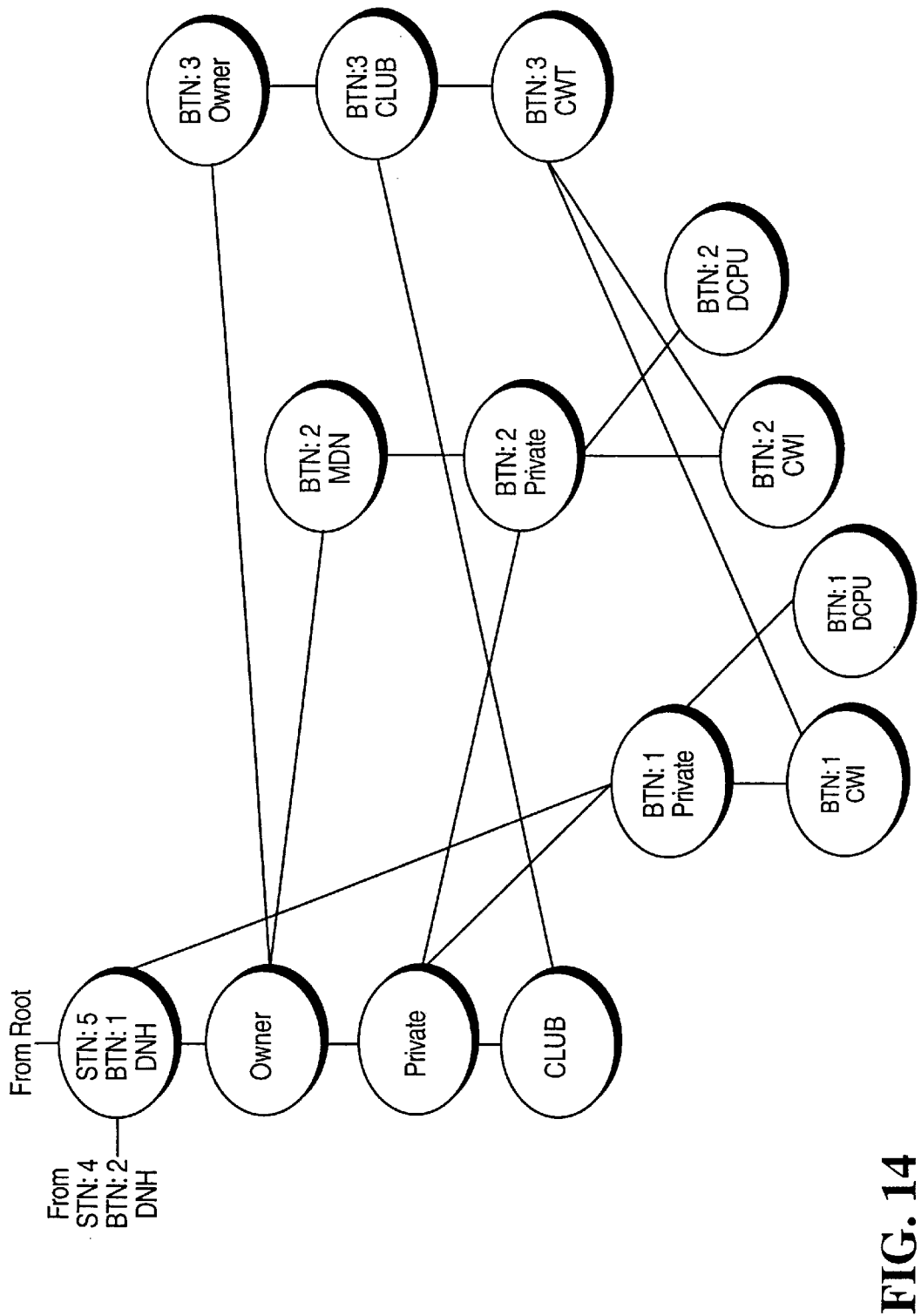
Figure 15:
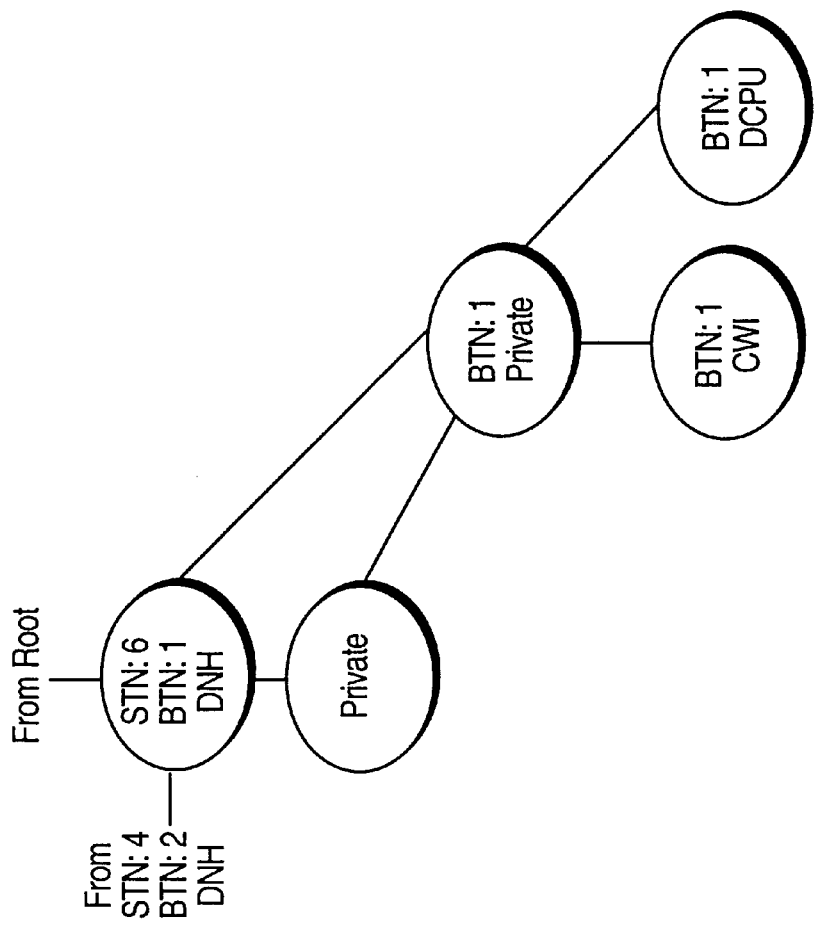
Figure 16:
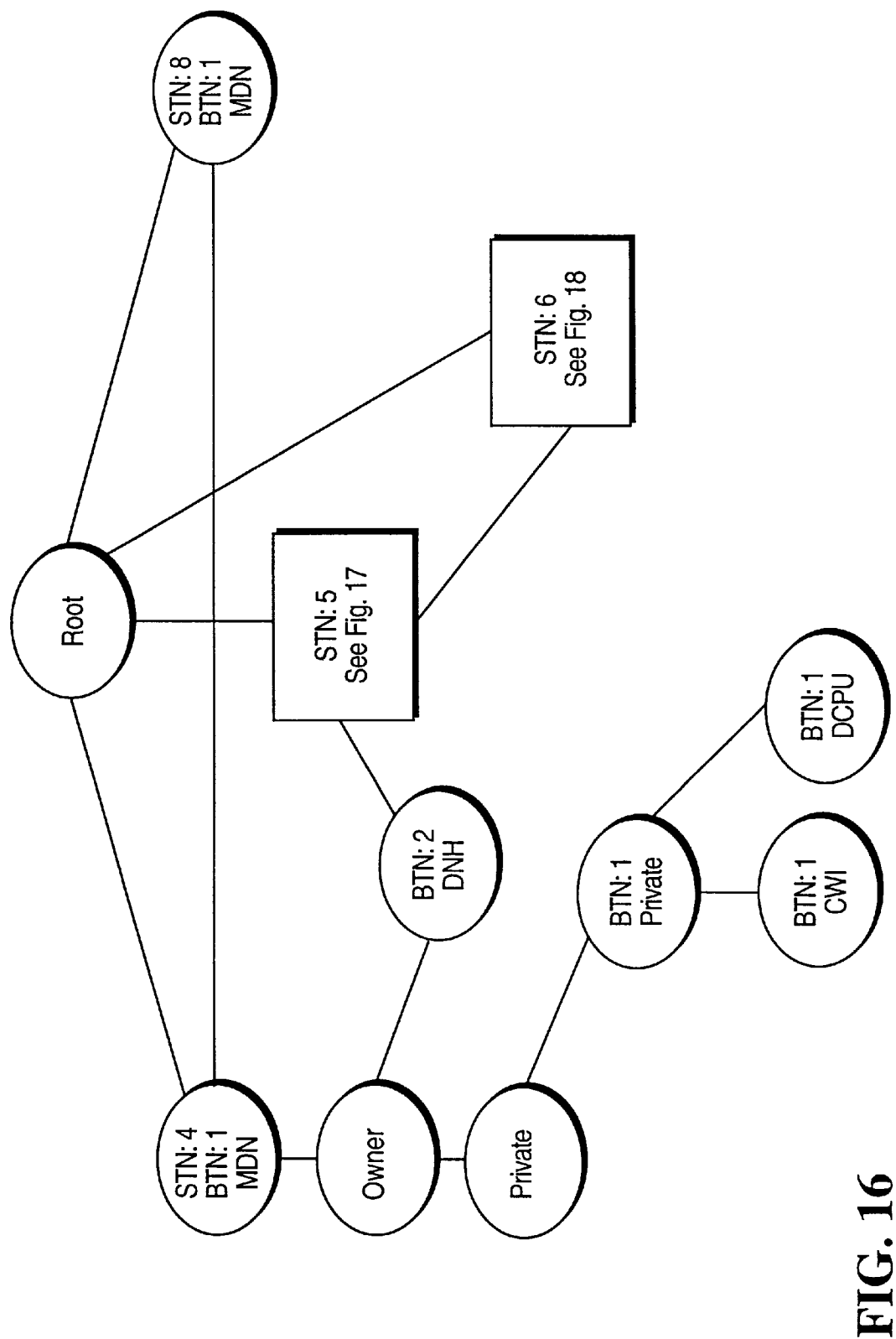
Figure 17:
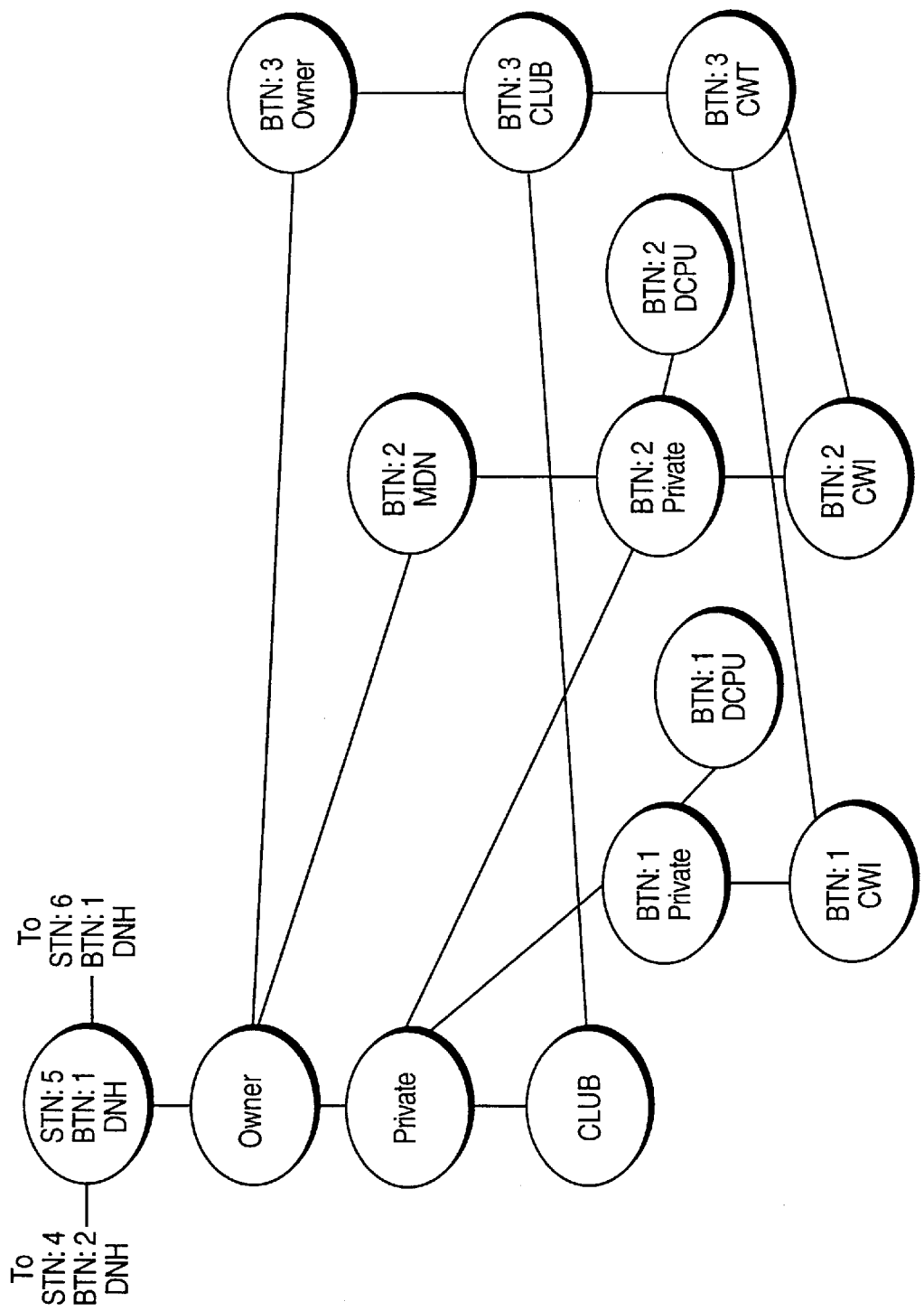
Figure 18:
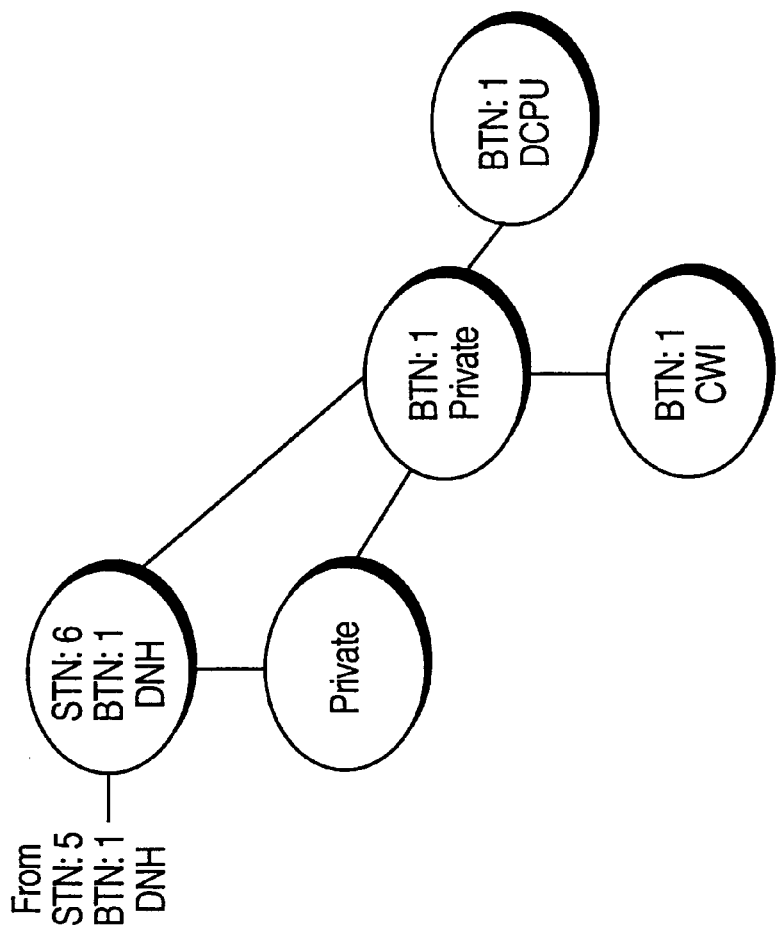

FIG. 11, a block diagram, illustrates the relevant portions of one embodiment of the network management and access layer, the voice element management subsystem, and the voice element management databases of FIG. 9. For the illustrated embodiment, the voice element management databases comprise a screen database 232a, a station configuration database 232b, a feature and parameter database 232c, a switch command and sequence database 232d, a request database 232e, and a communication protocol database 232f, located on the client and server as shown. The screen database stores user interface screens. The station configuration database 232b further stores rules and behaviors of device types—the device models—whereas the feature and parameter database 232c further stores the operational data of the devices. In the presently preferred embodiment, the device type models are copied into memory during operation to allow faster access and traversal. Rules and behaviors of device types, device type models, operational data of devices, and their usages will be described in further detail below.

The voice element subsystem comprises a user interface 234a, a rules processor 234b, a switch translator 234c, and a request/response processor 234d executed on the client and server as illustrated. These elements 234a–234d access the various databases 232a–232e as shown. To request a switch to perform an operation, a user interacts with the user interface 234a to generate requests. The requests are validated by the rules processors 234b. The validated requests are in turn translated into process requests by the switch translator 234c. The process requests are then transformed into switch command requests by the request/response processor 234d. Response requests from the switch are transformed back to process requests by the request/response processor 234d. The process requests are in turn translated back to validated requests by the switch translator 234c. The validated requests are then forwarded from the rules processor 34b to the user through the user interface 234a.

Additionally, the switch translator 234c comprises a compiler for performing the above described compilations of the rules and behaviors of device types into device type models, whereas the rules processor 234b comprises an array of evaluation functions for performing the above described evaluations of the model predicates of the device type models against the operational data of the devices while traversing the device type models. The compiler and the evaluation functions will be described in further detail below.

Lastly, the network management and access layer comprises a communication protocol processor 234e executed on a server. The communication protocol processor 234e is used to transfer switch commands and responses to and from the switches 236.

While for ease of understanding, the present invention has been described with a particular embodiment of the voice element subsystem and its databases, based on the above descriptions, it will be appreciated that the present invention may be practiced without many of these details. Furthermore, the present invention may be practiced with other network element management subsystems.

While the method and apparatus of the present invention have been described in terms of the above illustrated embodiments, those skilled in the art will recognize that the invention is not limited to the embodiments described. The present invention can be practiced with modification and alteration within the spirit and scope of the appended claims. The description is thus to be regarded as illustrative instead of restrictive on the present invention.

Thus, a method and an apparatus for automatically generating reconfiguration scripts for telecommunication devices have been described.

What is claimed is:

1. An apparatus comprising
   (a) a storage medium having stored therein a plurality of programming instructions which, when executed, implement a reconfiguration script generator to generate a reconfiguration script having a plurality of executable configuration commands for configuring/reconfiguring a plurality of telecommunication devices, based on a current configuration descriptive image and a target configuration descriptive image of the plurality of telecommunication devices, the reconfiguration script generator including a first function for building a current configuration feature dependency graph data structure to account for dependencies between current features of current telecommunication devices; and
   (b) an execution unit coupled to the storage medium to execute the plurality of programming instructions.

2. The apparatus as set forth in claim 1, wherein the reconfiguration script generator includes a second function for initializing a current configuration data structure with current configuration data based on the current configuration descriptive image of telecommunication devices.

3. The apparatus as set forth in claim 1, wherein the reconfiguration script generator includes a second function for initializing a target configuration data structure with target configuration data based on the target configuration descriptive image of telecommunication devices.

4. The apparatus as set forth in claim 1, wherein the reconfiguration script generator further includes:
   a second function to build a target configuration feature dependency graph data structure to account for dependencies between target features of target telecommunication devices, and
   a third function to build a reconfiguration feature dependency graph data structure based on the current and target configuration feature dependency graph data structures to account for dependency between impacted features of impacted telecommunication devices.

5. The apparatus as set forth in claim 1, wherein the reconfiguration script generator includes a second function to build a target configuration feature dependency graph data structure to account for dependencies between target features of target telecommunication devices.

6. The apparatus as set forth in claim 1, wherein the reconfiguration script generator generates the reconfiguration script employing rules and behaviors of the telecommunication devices modeled by a device model to determine dependencies between features of telecommunication devices.

7. The apparatus as set forth in claim 1, wherein the reconfiguration script generator generates the reconfiguration script employing at least one ordered linklist to enumerate deletion and addition operations required to configure/reconfigure the telecommunication devices.

8. The apparatus as set forth in claim 7, wherein the reconfiguration script generator includes a second function to enumerate a number of deletion operations required to configure/reconfigure the telecommunication devices in an ordered linklist.

9. The apparatus as set forth in claim 8, wherein the second function further enumerates a number of addition operations required to configure/reconfigure the telecommunication devices in the ordered linklist.

10. The apparatus as set forth in claim 7, wherein the reconfiguration script generator includes a second function to enumerate a number of addition operations required to configure/reconfigure the telecommunication devices in an ordered linklist.

11. The apparatus as set forth in claim 1, wherein the reconfiguration script generator includes a second function for outputting the plurality of executable configuration commands based on at least one ordered linklist identifying deletion and addition operations required to configure/reconfigure the telecommunication devices.

12. A method comprising:
   a) receiving a current configuration descriptive image of telecommunication devices;
   b) receiving a target configuration descriptive image of telecommunication devices; and
   c) automatically generating a reconfiguration script having a plurality of executable configuration commands for configuring/reconfiguring a plurality of telecommunication devices, based on the received current configuration descriptive image and target configuration descriptive image of the plurality of telecommunication devices, including building of a current configuration feature dependency graph data structure to account for dependencies between current features of current telecommunication devices.

13. The method as set forth in claim 12, wherein (c) includes initializing a current configuration data structure with current configuration data based on the received current configuration descriptive image of telecommunication devices.

14. The method as set forth in claim 12, wherein (c) includes initializing a target configuration data structure with target configuration data based on the received target configuration descriptive image of the plurality of telecommunication devices.

15. The method as set forth in claim 12, wherein (c) further includes:
   building a target configuration feature dependency graph data structure to account for dependencies between target features of the target telecommunication devices, and
   building a reconfiguration feature dependency graph data structure based on the current and target configuration feature dependency graph data structures to account for dependencies between impacted features of impacted telecommunication devices.

16. The method as set forth in claim 12, wherein (c) includes building a target configuration feature dependency graph data structure to account for dependencies between target features of target telecommunication devices.

17. The method as set forth in claim 12, wherein (c) includes employing rules and behaviors of the telecommunication devices modeled by a device model to determine dependencies between features of the telecommunication devices.

18. The method as set forth in claim 12, wherein (c) includes employing at least one ordered linklist to enumerate deletion and addition operations required to configure/reconfigure the telecommunication devices.

19. The method as set forth in claim 18, wherein (c) includes enumerating a number of deletion operations required to reconfigure the telecommunication devices in an ordered linklist.

20. The method as set forth in claim 19, wherein (c) further includes enumerating a number of addition operations required to configure/reconfigure the telecommunication devices in the ordered linklist.

21. The method as set forth in claim 18, wherein (c) includes enumerating a number of addition operations required to configure/reconfigure the telecommunication devices in an ordered linklist.

22. The method as set forth in claim 12, wherein step (c) includes outputting the plurality of executable configuration commands based on at least one ordered linklist identifying deletion and addition operations required to configure/reconfigure the telecommunication devices.

* * * * *